United States Patent
van der Heijden et al.

(10) Patent No.: US 6,519,119 B1
(45) Date of Patent: Feb. 11, 2003

(54) STRUCTURE FOR CURRENT PERRPENDICULAR TO PLANE GIANT MAGNETORESISTIVE READ HEADS

(75) Inventors: Petrus A. van der Heijden, Pittsburgh, PA (US); Billy Wayne Crue, Pittsburgh, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 145 days.

(21) Appl. No.: 09/705,853

(22) Filed: Nov. 3, 2000

Related U.S. Application Data

(60) Provisional application No. 60/163,351, filed on Nov. 3, 1999, provisional application No. 60/163,406, filed on Nov. 3, 1999, and provisional application No. 60/175,861, filed on Jan. 12, 2000.

(51) Int. Cl.[7] .................................................. G11B 5/39
(52) U.S. Cl. ..................................................... 360/324
(58) Field of Search ............................. 360/324–324.12

(56) References Cited

U.S. PATENT DOCUMENTS

| | | | |
|---|---|---|---|
| 4,047,236 A | 9/1977 | Lee | |
| 4,291,351 A | 9/1981 | Pennell et al. | |
| 5,446,613 A | 8/1995 | Rottmayer | |
| 5,455,730 A | 10/1995 | Dovek et al. | |
| 5,543,989 A | 8/1996 | Westwood | |
| 5,576,914 A | 11/1996 | Rottmayer et al. | |
| 5,583,727 A | 12/1996 | Parkin | |
| 5,627,704 A | 5/1997 | Lederman et al. | |
| 5,654,854 A | * 8/1997 | Mallary | |
| 5,668,688 A | 9/1997 | Dykes et al. | |
| 5,682,284 A | 10/1997 | George | |
| 5,731,937 A | 3/1998 | Yuan | |
| 5,784,224 A | 7/1998 | Rottmayer et al. | |
| 5,809,637 A | 9/1998 | Rottmayer | |
| 5,880,912 A | * 3/1999 | Rottmayer | |
| 5,891,586 A | 4/1999 | Hasegawa et al. | |
| 6,134,090 A | 10/2000 | Mao et al. | |
| 6,285,531 B1 | * 9/2001 | Ohsawa et al. | |

OTHER PUBLICATIONS

K. Bussmann et al., "CPP Giant Magnetoresistance of NiFeCo/Cu/CoFe/Cu Multilayers", *IEEE Trans. On Magn.*, vol. 34, No. 4, pp. 924–926 (1998).

* cited by examiner

*Primary Examiner*—Robert S. Tupper
(74) *Attorney, Agent, or Firm*—Benjamin T. Queen, II; Pietragallo, Bosick & Gordon

(57) ABSTRACT

A recording head for use with magnetic recording media includes a current perpendicular to plane (CPP) type giant magnetoresistive (GMR) read element, with the alternating magnetic and nonmagnetic layers within the GMR read element either perpendicular or angled to the read head's shields. This structure maximizes the number of alternating layers within the GMR read element, and minimizes the area available for flow of the test current. Both total resistance of the GMR element, and the change in resistance as a function of changes in magnetic flux, relative to total resistance, are thereby increased. The sensitivity of the GMR read element is thereby increased, permitting storage of information within magnetic recording media at greater densities. The invention also includes a method of manufacturing a read head using such a GMR element.

14 Claims, 29 Drawing Sheets

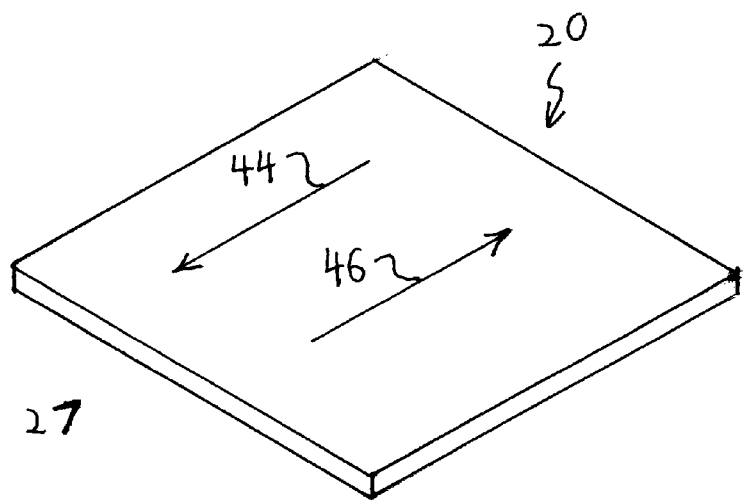
FIG. 27
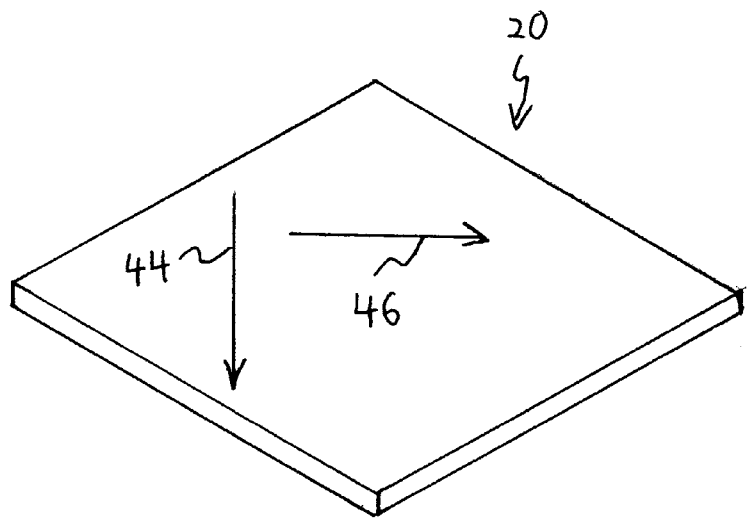
FIG. 28
FIG. 29
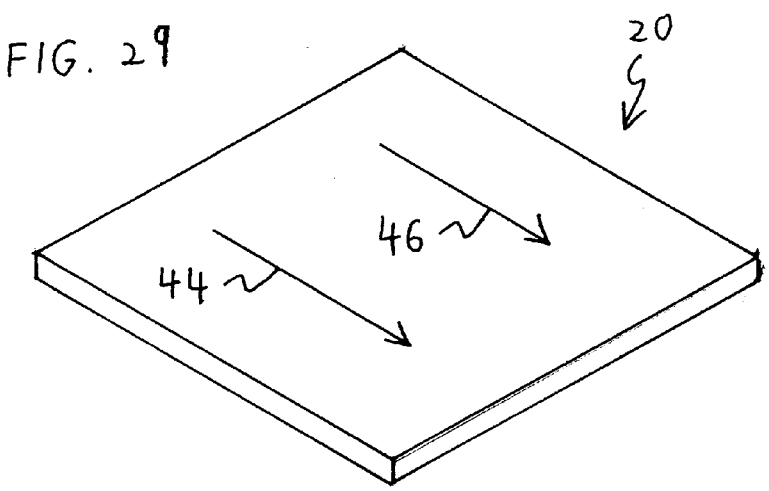

STRUCTURE FOR CURRENT PERRPENDICULAR TO PLANE GIANT MAGNETORESISTIVE READ HEADS

CROSS REFERENCE TO RELATED APPLICATIONS

This application claims the benefit of U.S. Provisional Patent Application No. 60/163,351, filed Nov. 3, 1999, U.S. Provisional Patent Application No. 60/163,406, filed Nov. 3, 1999, and U.S. Provisional Patent Application No. 60/175,861, filed Jan. 12, 2000.

BACKGROUND OF THE INVENTION

1. Field of the Invention

This application relates to giant magnetoresistive read heads. More specifically, the invention is an improved structure for a giant magnetoresistive read head having the test current applied substantially perpendicular to the plane of the read head's layers.

2. Description of the Related Art

Magnetoresistive (MR) and giant magnetoresistive (GMR) read elements for reading from magnetic recording media have been used to overcome the limited sensitivity of inductive reading. GMR technology has also been incorporated with spin-valve structures that are well known in the art. GMR read elements are generally composed of alternating layers of magnetic and nonmagnetic material, so that, when exposed to a magnetic field, the relative change in the orientation of the magnetizations in the magnetic layers alters the spin-dependent scattering of conduction electrons, thereby increasing or decreasing the resistance of the GMR head to an applied test current. A constant resistance level indicates a binary "0," and a changing resistance level indicates a binary "1."

Most current GMR read heads are structured so that the test current is applied in the same plane as the alternating magnetic and nonmagnetic layers (CIP). Applying the current perpendicular to the plane of these layers (CPP) has been found to increase the GMR effect.

Typical CPP GMR read elements are oriented with the alternating layers perpendicular to the recording medium's tracks, and parallel to the magnetic shields on either side of the GMR element. Such designs have limited GMR effect due to the limited number of alternating magnetic and nonmagnetic layers that will fit within the available space within the read head.

Accordingly, there is a need for a CPP GMR read element having its layers oriented perpendicular or angled with respect to the shields. Additionally, there is a need for a CPP GMR read element with increased read sensitivity. Further, there is a need for a CPP GMR element permitting storage within magnetic recording media at greater densities.

SUMMARY OF THE INVENTION

The present invention is an improved recording head for use with magnetic recording media and a method of making such a read head. The GMR read element of the present invention has a test current applied substantially perpendicular to the alternating magnetic and nonmagnetic layers of the GMR element (CPP), and is preferably oriented so that the layers are substantially perpendicular to the shields, and substantially parallel to the track. This configuration maximizes the number of layers that may be included as compared to other equivalent size GMR heads while minimizing the area perpendicular to the test current, thereby maximizing both resistance, and the change in resistance relative to total resistance with changing magnetic flux, within the GMR element.

A preferred embodiment of the present invention includes a recording head combining a read portion and a write portion. The write portion may be of either perpendicular or longitudinal configuration. A typical perpendicular recording head includes a main pole, an opposing pole magnetically coupled to the main pole, and an electrically conductive coil adjacent to the main pole. The bottom of the opposing pole will typically have a surface area greatly exceeding the surface area of the main pole's tip. Likewise, a typical longitudinal recording head includes a pair of poles, with a coil adjacent to one pole. Unlike a perpendicular recording head, a longitudinal recording head will typically use poles having bottom surfaces with substantially equal areas. In either case, electrical current flowing through the coil creates a flux through the main pole. The direction of the flux may be reversed by reversing the direction of current flow through the coil.

In some preferred embodiments, the opposing pole of the perpendicular head (or the first pole of the longitudinal head) can also form one of two substantially identical shields for the GMR read element, which are parallel to the trackwidth. The GMR read element is located between these shields. The GMR read element includes a plurality of alternating magnetic and nonmagnetic layers. Electrical contacts are electrically connected to either side of the GMR read element, also between the two shields, and are dimensioned and configured to apply current perpendicular to the plane of the various layers of the GMR element (CPP). The GMR layers may be perpendicular to the shields and trackwidth, or may be angled with respect to the shields and trackwidth. Although any angle greater than 0° and less than 90° is possible, preferred angles are between 10° and 80°. Angling the GMR element minimizes the cost of manufacture, while making the GMR element perpendicular to the shields minimizes the trackwidth. A relatively weak permanent magnet is located directly above the GMR read element, thereby orientating adjacent magnetic fields within the magnetic layers of the GMR element perpendicular to each other when the GMR element is not in close proximity to another magnetic field.

A typical magnetic recording medium includes a first layer having a plurality of magnetically permeable tracks separated by nonmagnetized transitions. If perpendicular recording is desired, the magnetic recording medium will include a magnetically permeable lower level. The lower level is magnetically soft relative to the tracks.

To read from the magnetic recording medium, the recording head is separated from the magnetic recording medium by the flying height. The magnetic recording medium is moved past the recording head so that the recording head follows the tracks of the magnetic recording medium, typically with the magnetic recording medium first passing under one shield, followed by the GMR read element, then passing under the write portion of the head pole. As the magnetic recording medium passes under the GMR element, the magnetic fields within the recording medium orient the adjacent magnetic fields within the magnetic GMR layers so that they are either parallel (corresponding to minimum resistance) or antiparallel (corresponding to maximum resistance), depending on the direction of the magnetic field being read from the recording medium. A sense current is passed through the GMR element by the contacts, thereby enabling the GMR element's resistance to be detected. A constant level of resistance is read as a binary "0," and a change in resistance is read as a binary "1."

The sensitivity of the GMR read element is proportional to both the number of layers present, and to the thickness of each layer. Two factors affect the sensitivity of the GMR read element: total resistance; and the magnitude of the change in resistance with changing magnetic flux relative to the total resistance. Total resistance is proportional to the length of the GMR read element (measured in the direction of current flow) divided by the area the current may travel through (measured perpendicular to the current flow). By orienting the GMR element so that the layers are oriented perpendicular to the shields and parallel to the read head's direction of travel, the number of layers across the track-width is maximized. Additionally, the area through which current flows is minimized, thereby further increasing resistance. The result of both of these changes is that both total resistance, and the change in resistance as a function of magnetic flux with respect to total resistance, are maximized. Using a GMR read element with greater sensitivity permits using magnetic recording media having greater storage densities.

It is therefore an aspect of the present invention to provide a GMR read element having the alternating magnetic and nonmagnetic layers angled with respect to the shields, thereby increasing sensitivity of the GMR read element and permissible storage density of the magnetic recording medium while keeping costs of manufacture minimized.

It is another aspect of the present invention to provide a GMR read element having the alternating magnetic and nonmagnetic layers substantially perpendicular with respect to the shields, thereby maximizing the sensitivity of the GMR read element and permissible storage density of the magnetic recording medium.

It is a further aspect of the present invention to provide a GMR read element wherein the test current is applied substantially perpendicular to the plane of the alternating magnetic and nonmagnetic layers.

It is another aspect of the present invention to provide a CPP GMR read element usable in conjunction with a perpendicular write head.

It is a further aspect of the present invention to provide a CPP GMR read element usable in conjunction with a longitudinal write head.

It is another aspect of the present invention to provide a CPP GMR read head having a maximized number of alternating magnetic and nonmagnetic layers.

It is a further aspect of the present invention to provide a CPP GMR read head having minimized area available to the test current, thereby increasing resistance.

It is another aspect of the present invention to provide a method of manufacturing a magnetic recording head having a CPP GMR read element.

These and other aspects of the invention will become more apparent through the following description, with reference to the drawings.

BRIEF DESCRIPTION OF THE DRAWINGS

FIG. 27 is a perspective, partially schematic schematic view of a segment of a magnetic layer within a GMR read element, showing antiparallel flux lines.

FIG. 28 is a perspective, partially schematic view of a segment of a magnetic layer within a GMR read element, showing perpendicular flux lines.

FIG. 29 is a perspective, partially schematic view of a segment of a magnetic layer within a GMR read element, showing parallel flux lines.

Like reference numbers denote like elements throughout the specification.

DESCRIPTION OF THE PREFERRED EMBODIMENTS

A preferred embodiment of the invention is a magnetic recording head having a giant magnetoresistive (GMR) read element wherein a test current is applied substantially perpendicular to the plane of the alternating magnetic and nonmagnetic layers within the GMR element (CPP). The GMR element's layers may be substantially perpendicular or angled with respect to their magnetic shields.

Figure 1:
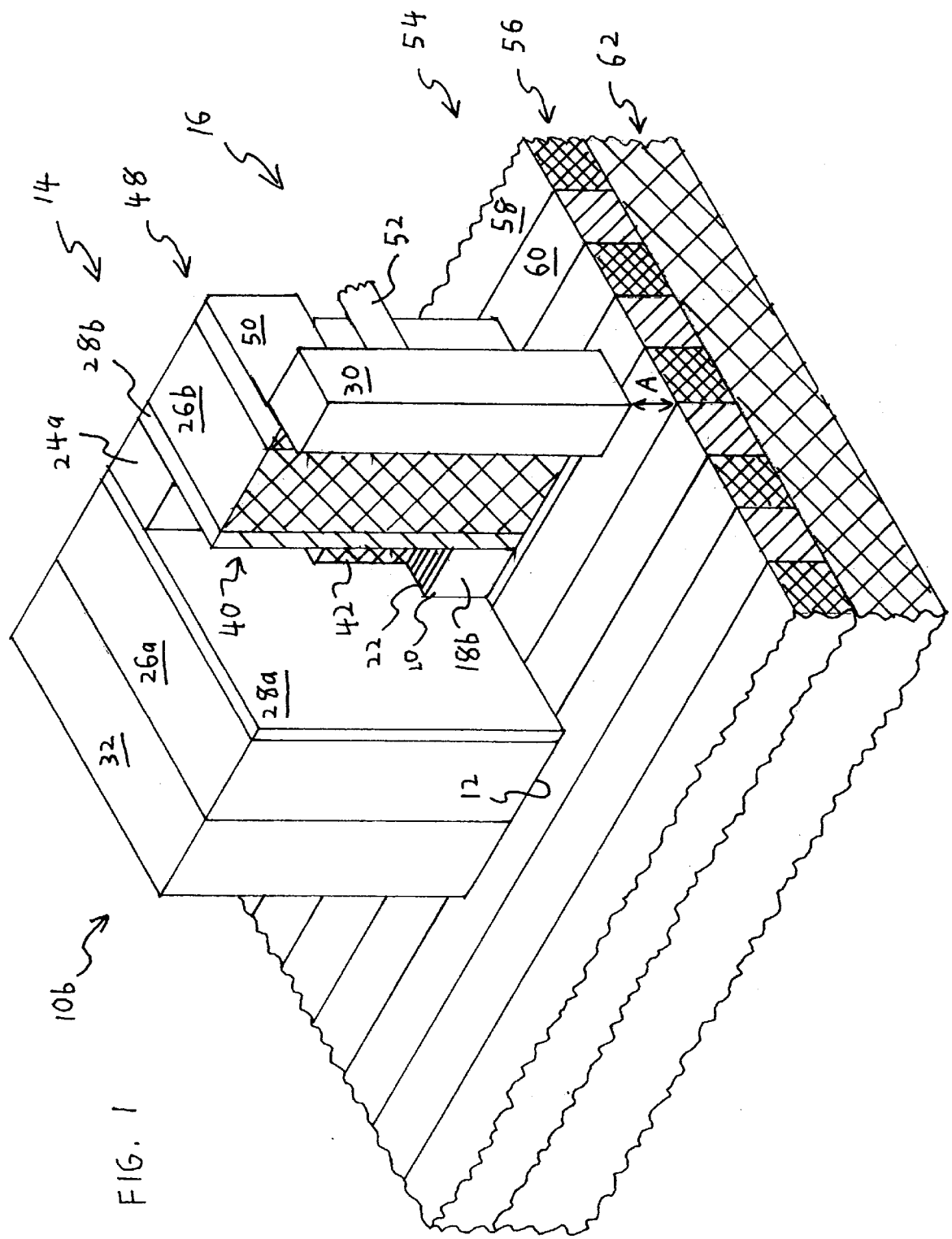
FIG. 1 is a partially cutaway, top perspective, partially schematic view of a recording head using a CPP GMR read element according to an embodiment of the present invention.
Figure 2:
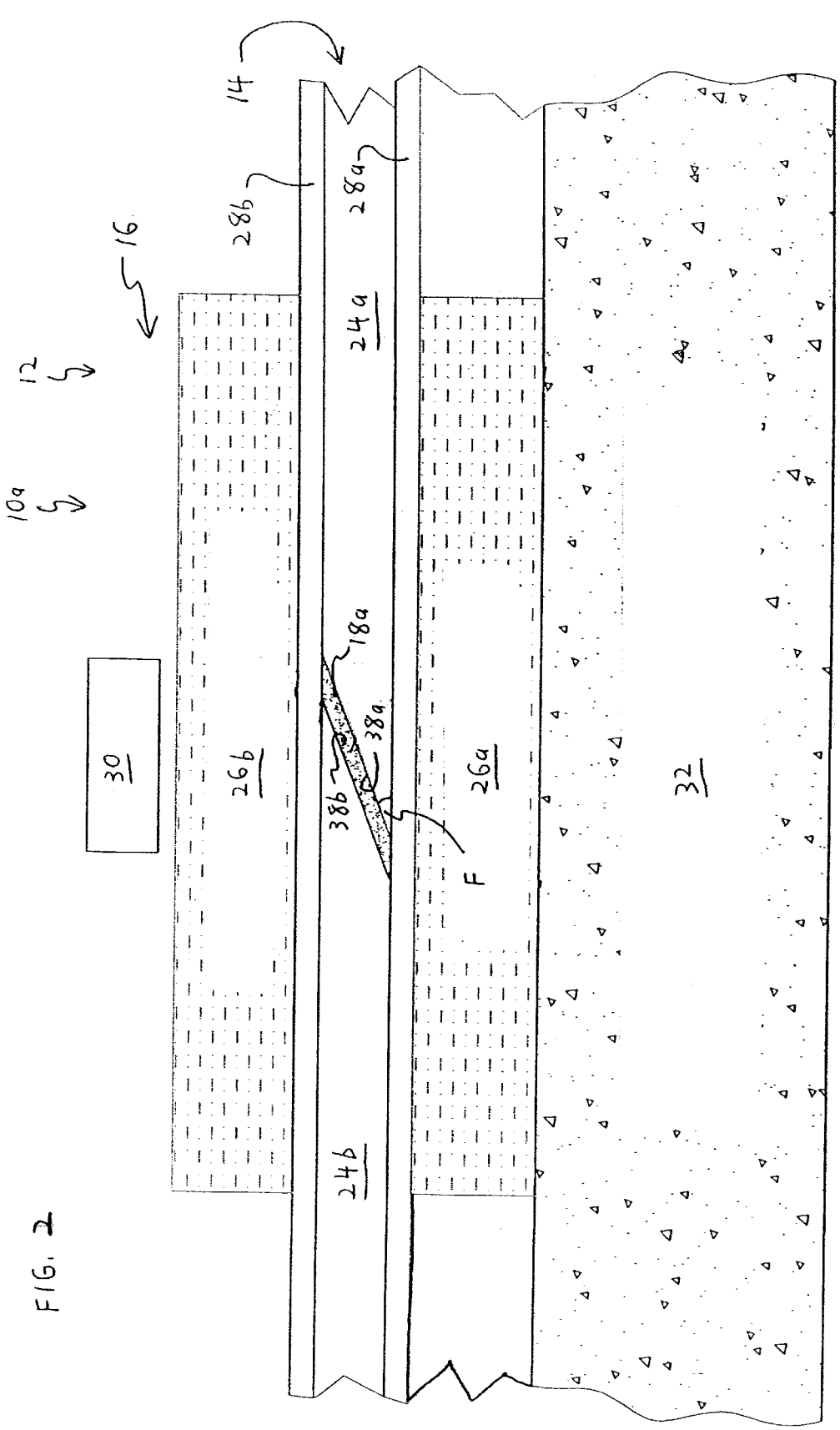
FIG. 2 is a bottom view of a first embodiment of a perpendicular recording head using a CPP GMR read element according to the present invention.
Figure 16:
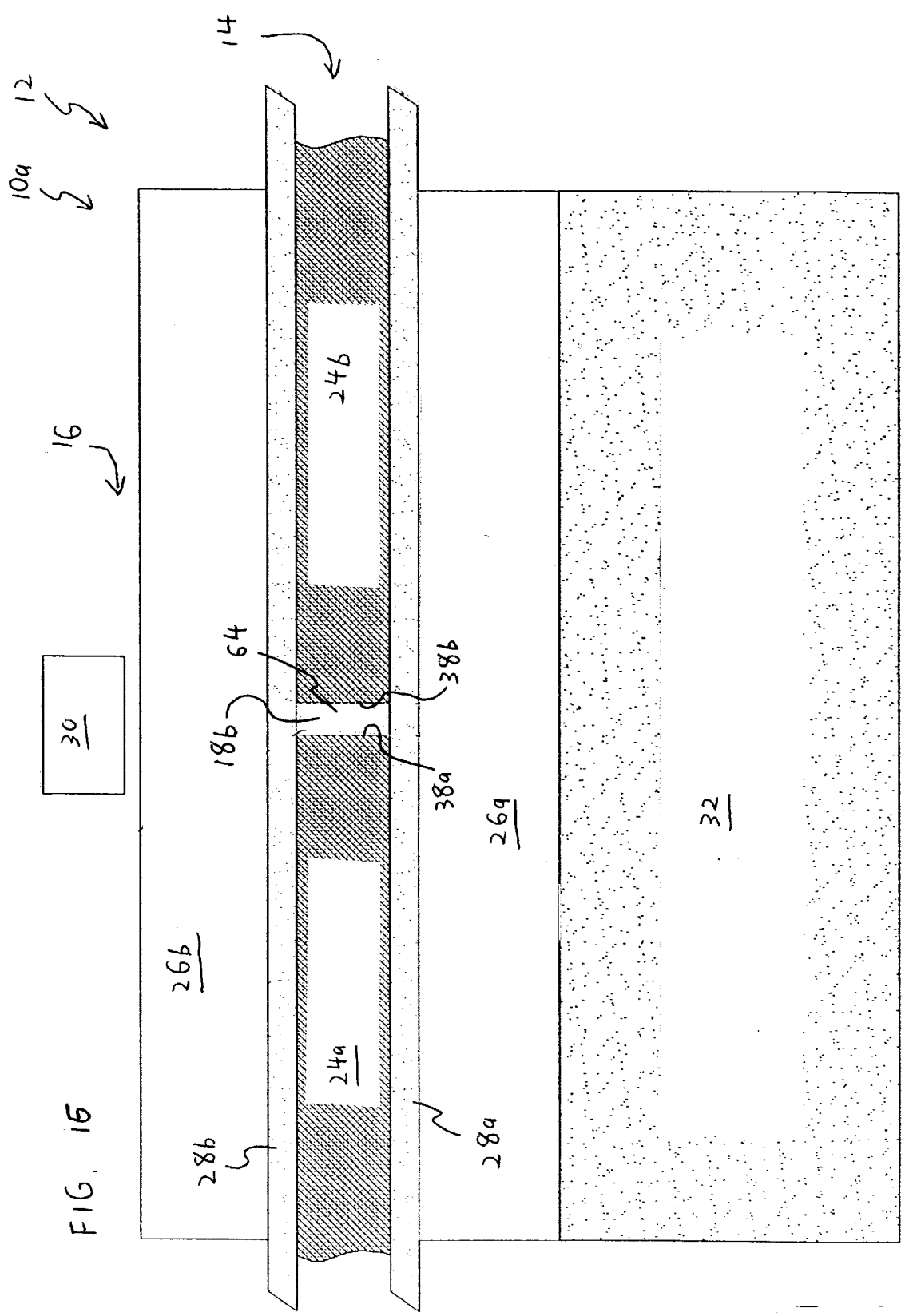
FIG. 16 is a bottom view of a second embodiment of a perpendicular recording head using a CPP GMR read element according to the present invention.

Referring to FIGS. 1, 2, and 16, a recording head 10 is illustrated, with 10a referring to the recording head having an angled GMR element, and 10b referring to the recording head having a substantially perpendicular GMR element. FIGS. 2 and 16 illustrate the bottom or air-bearing surface 12, indicated with respect to the remainder of the recording head 10 on FIG. 1, which in use faces the magnetic recording medium. The magnetic recording head 10 preferably includes a read portion 14 and a write portion 16.

Figure 21:
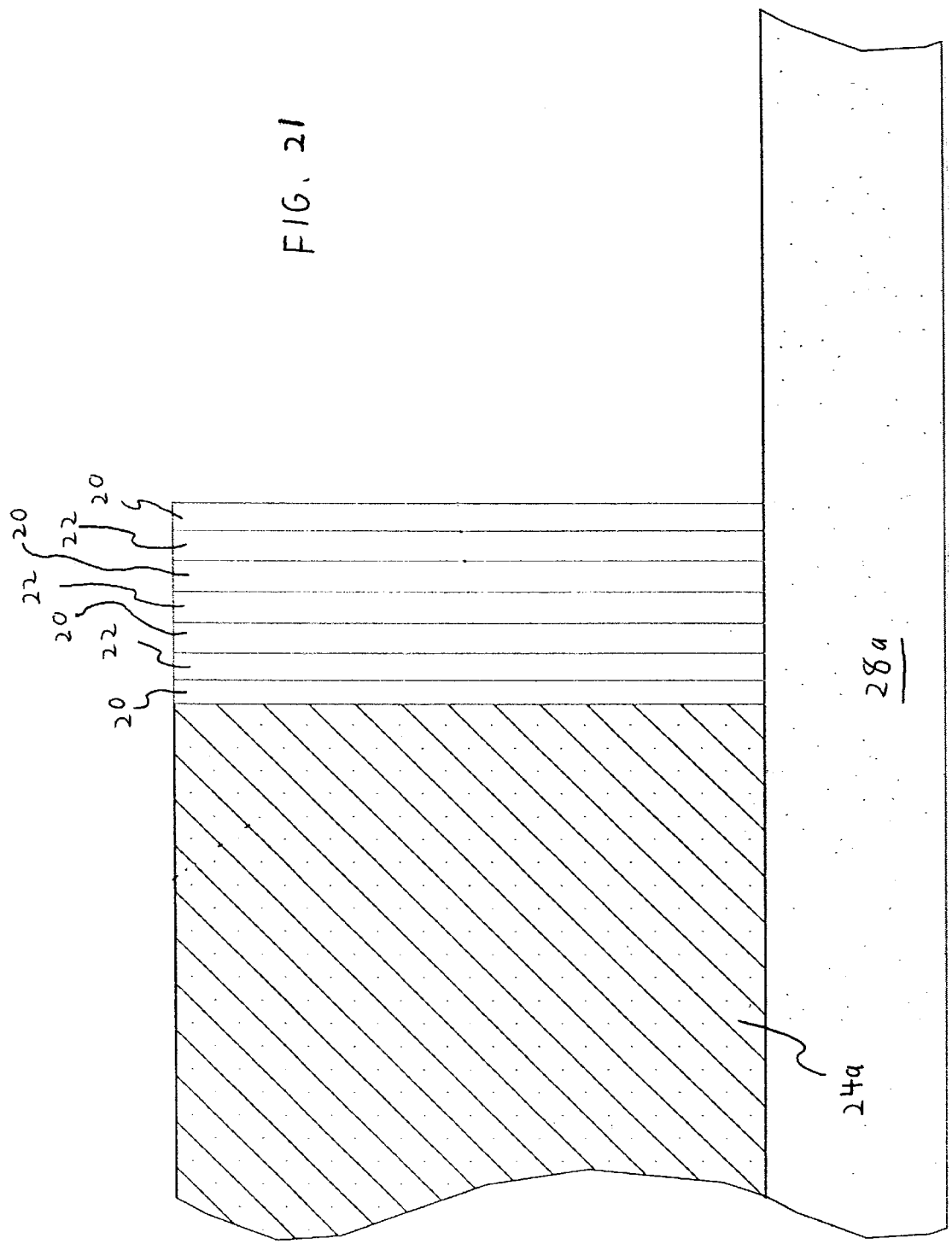
FIG. 21 is a bottom view of a CPP GMR read element and first contact for use in a second embodiment of a perpendicular recording head using a CPP GMR read element after the according to the present invention.
Figure 22:
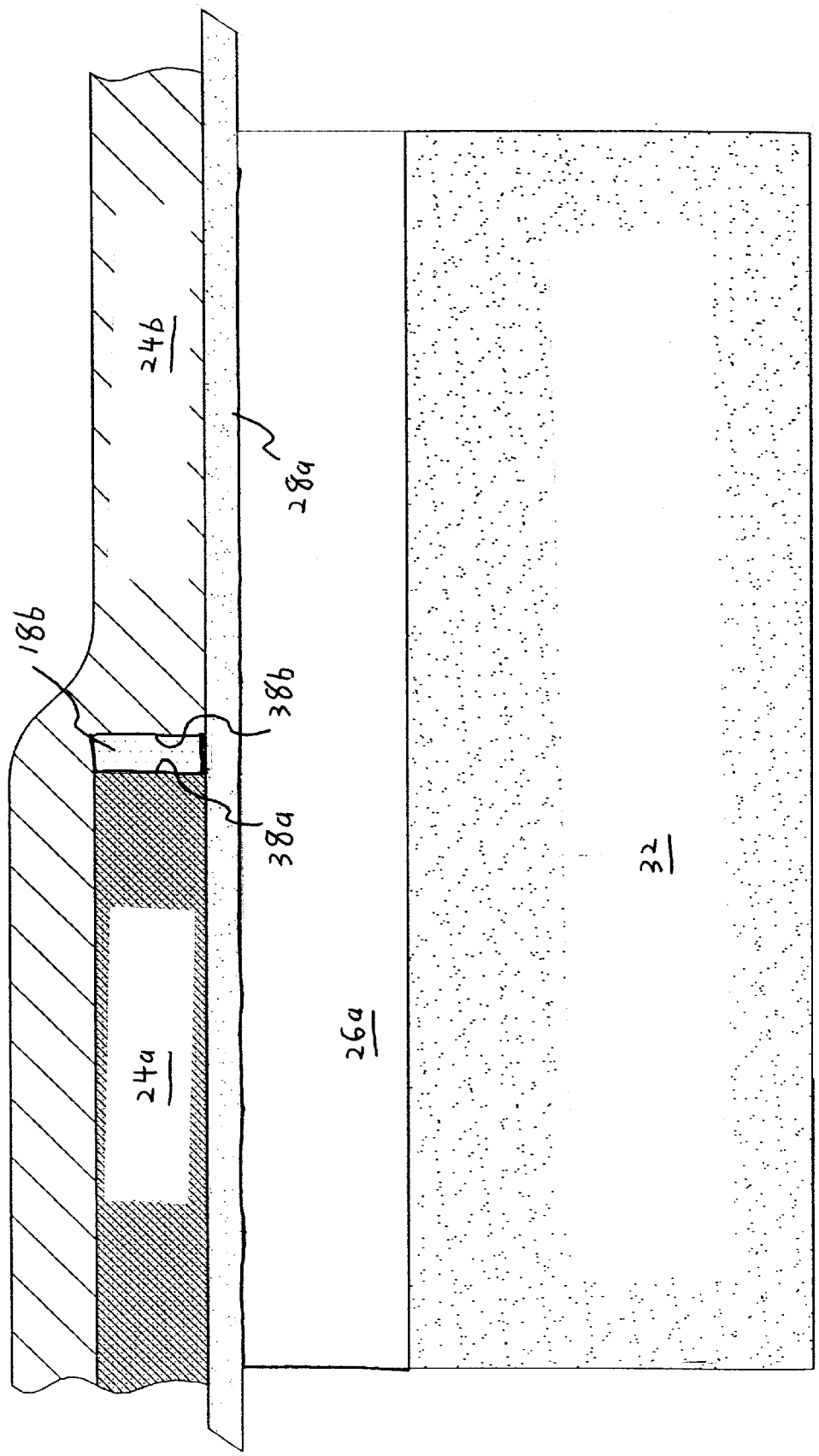
FIG. 22 is a bottom view of a substrate, first magnetic shield, first gap material, first contact, GMR element, and initially deposited second contact material for use in a second embodiment of a perpendicular recording head using a CPP GMR read element after the according to the present invention.

Referring to FIGS. 1, 2, 16, and 21, the read portion includes a GMR read element 18. As used herein, 18a designates the angled GMR read element (with respect to the shields 26 described below), and 18b designates the perpendicular GMR read head (also with respect to the shields 26 described below. The read head 18 is substantially perpendicular to the air-bearing surface 12. As best shown in FIG. 21, the read head 18 includes a plurality of magnetic 20 and nonmagnetic 22 layers, with the layers 20,22 also being substantially perpendicular to the air-bearing surface 12, and either substantially perpendicular or angled with respect to the shields 26. If the layers 20,22 are angled, the angle F between the shields 26 and GMR element 18a may be any angle greater than 0° and less than 90°, but is more preferably between 10° and 80°. A GMR read element will preferably have at least two magnetic layers and one nonmagnetic layer. A preferred embodiment of the present invention has 28 magnetic layers, alternating with 28 nonmagnetic layers. A preferred material for the magnetic layers is an alloy composed of nickel, cobalt, and iron, with a preferred thickness of 1.5 nm, and a preferred material for the nonmagnetic layers is copper, with a preferred thickness of 2 nm. A read element 18 of the present invention may include additional layers having permanent magnetization, known in the art as a spin valve.

As shown in FIGS. 2 and 16, located on either side of the GMR read element 18 are electrical leads 24a,24b. The electrical leads 24a,24b are electrically connected to opposing sides of the GMR read element 18, and are dimensioned and configured to permit the flow of a test current from one lead 24a,24b, through the GMR read element 18, to the opposing lead 24a,24b,with the test current flowing perpendicular to the layers 20,22 of GMR element 18. Preferred materials for the leads 24a,24b are gold and copper. Other electrically conductive materials may be used.

Located in front of GMR read element 18 and leads 24a,24b are magnetic shields 26a,26b. The shields 26a,26b shield the GMR read element from domains on the magnetic recording medium adjacent to the domain currently being read, thereby preventing errors in reading the magnetic recording medium. Gap material 28a,28b preferably separates shields 26a,26b from the GMR read element 18 and leads 24a,24b. The shields 26a,26b are preferably made from nickel iron, and the gap material 28a,28b is preferably alumina.

In some preferred embodiments, the shield 26b not only forms part of the read portion 14, but also the write portion 16. The shield 26b, in addition to protecting the GMR element 18 from stray magnetic fields, also serves as one of two opposing poles for the write portion 16. The write portion 16 may form either a perpendicular or longitudinal write head. In the case of a longitudinal write head, the shield 26b forms the first of two opposing poles, with pole 30 forming the second opposing pole. In the case of a perpendicular write head, the shield 26b forms the opposing pole, while pole 30 forms the main write pole. It should be noted that, although the figures show the relative area of poles 26b,30 in the proper proportion for a perpendicular write head, these proportions may change for a longitudinal write head. The poles 26b,30 are magnetically coupled at the recording head's top 48, preferably by a joint 50. A coil 52 passes adjacent to pole 30, thereby providing a path for current for inducing a magnetic field within the poles 26b,30 for writing to the magnetic recording medium. Located opposite the pole 30, defining the forward portion of the recording head 10, is a substrate 32, preferably made from ceramic, on which the various components of the head 10 are assembled. An oxidic layer, for example, NiO, may be provided along the bottom surface of the GMR read element. Such a layer will help prevent spin independent scattering of electrons along this surface. Such scattering is also prevented by the gaps 28a,28b.

Also illustrated in FIG. 1, a magnetic storage medium 54, for example, a magnetic disk, for use with a recording head 10 is illustrated. Regardless of whether perpendicular or longitudinal recording is desired, the storage medium 54 includes a first layer 56 having a plurality of magnetically permeable tracks 58, which are divided into sectors, with each sector having several different magnetic fields within the magnetically permeable material (not shown and well understood). The tracks 58 are separated by nonmagnetized transitions 60. If perpendicular recording is desired, then the storage medium 54 also includes a magnetically permeable lower layer 62, which is magnetically soft relative to the tracks 58. In use, the magnetic recording medium 54 will be separated from the bottom surface 12 of recording head 10 by a flying height A. The flying height A is sufficiently small so that a high concentration of flux from pole 30 (or poles 26b,30 for longitudinal recording) will pass through track 58, but sufficiently large to prevent damage to magnetic storage medium 54 from contact with recording head 10.

Assembly of the recording head 10 is best illustrated in FIGS. 3–15 for the embodiment 10a having the angled GMR read head, and in FIGS. 17–26 for the embodiment 10b having the perpendicular GMR read head. Both assembly processes follow a similar sequence of steps, and will therefore be described together. It will be seen, however, that the angled GMR read head is easier and less expensive to assemble, while the perpendicular GMR read head provides maximum storage density.

Figure 3:
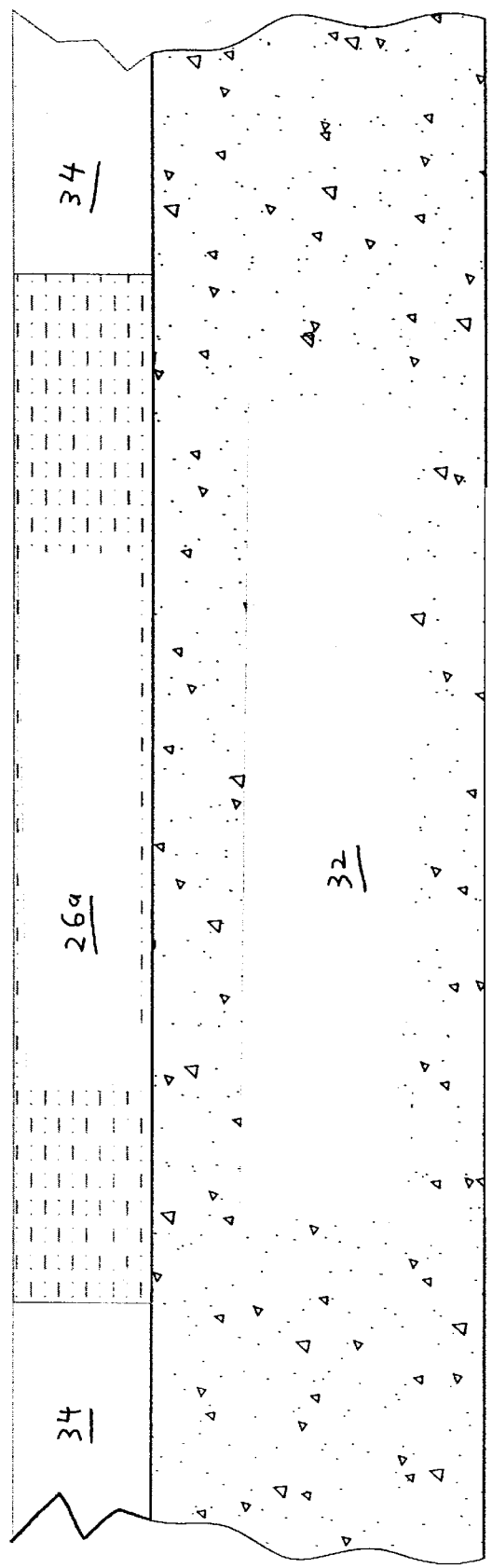
FIG. 3 is a bottom view of a substrate and deposited first magnetic shield for use in a first embodiment of a perpendicular recording head using a CPP GMR read element after the according to the present invention.
Figure 4:
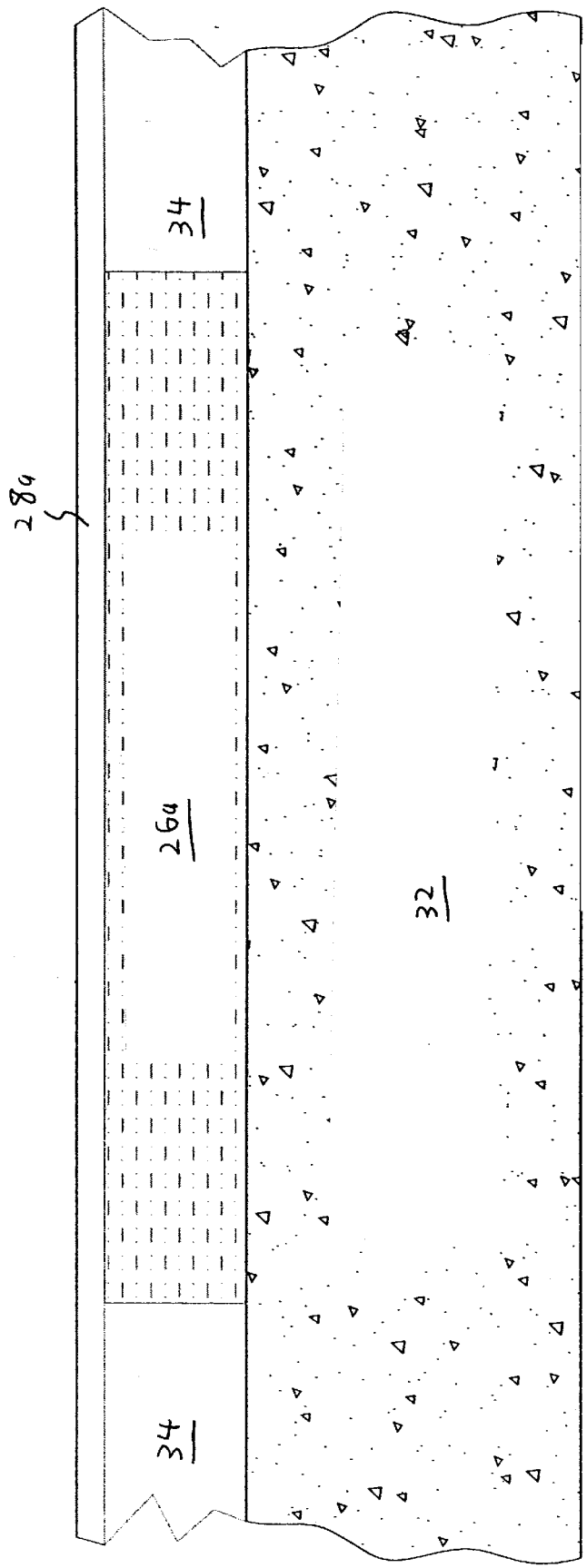
FIG. 4 is a bottom view of a substrate, first magnetic shield, and first gap material for use in a first embodiment of a perpendicular recording head using a CPP GMR read element after the according to the present invention.
Figure 5:
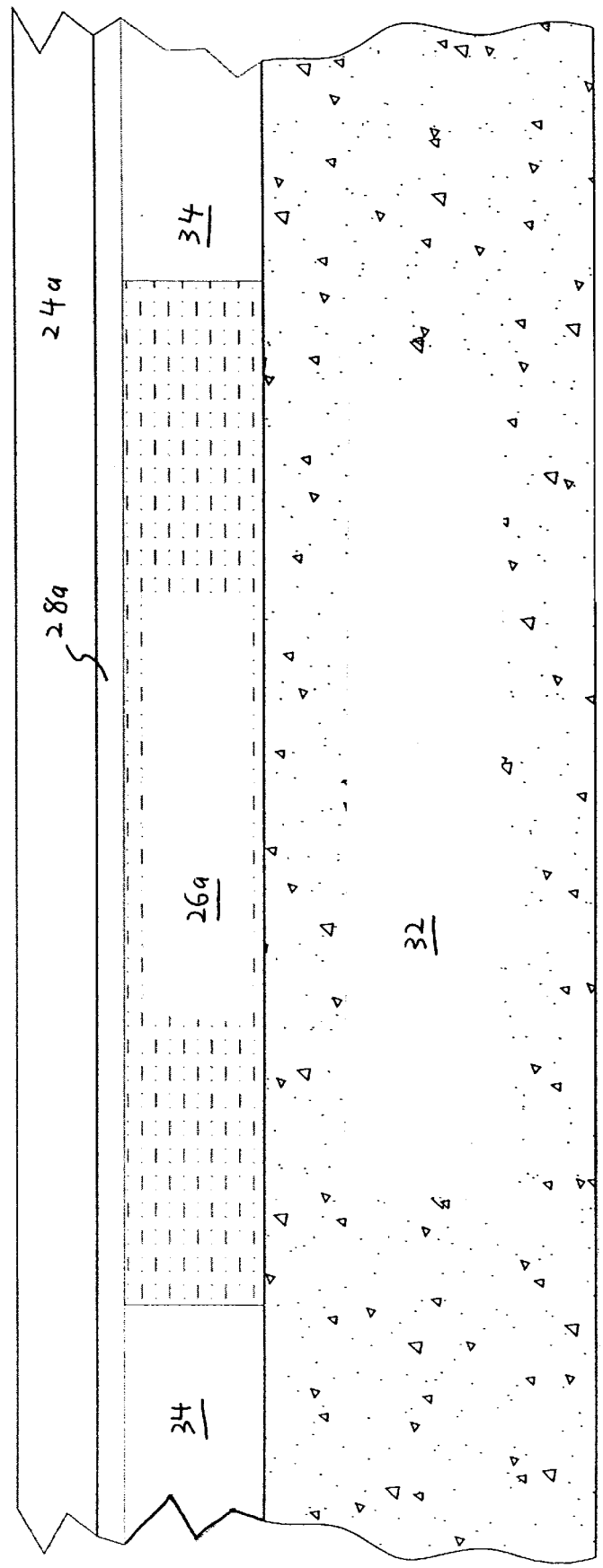
FIG. 5 is a bottom view of a substrate, first magnetic shield, first gap material, and initially deposited contact material for use in a first embodiment of a perpendicular recording head using a CPP GMR read element after the according to the present invention.
Figure 6:
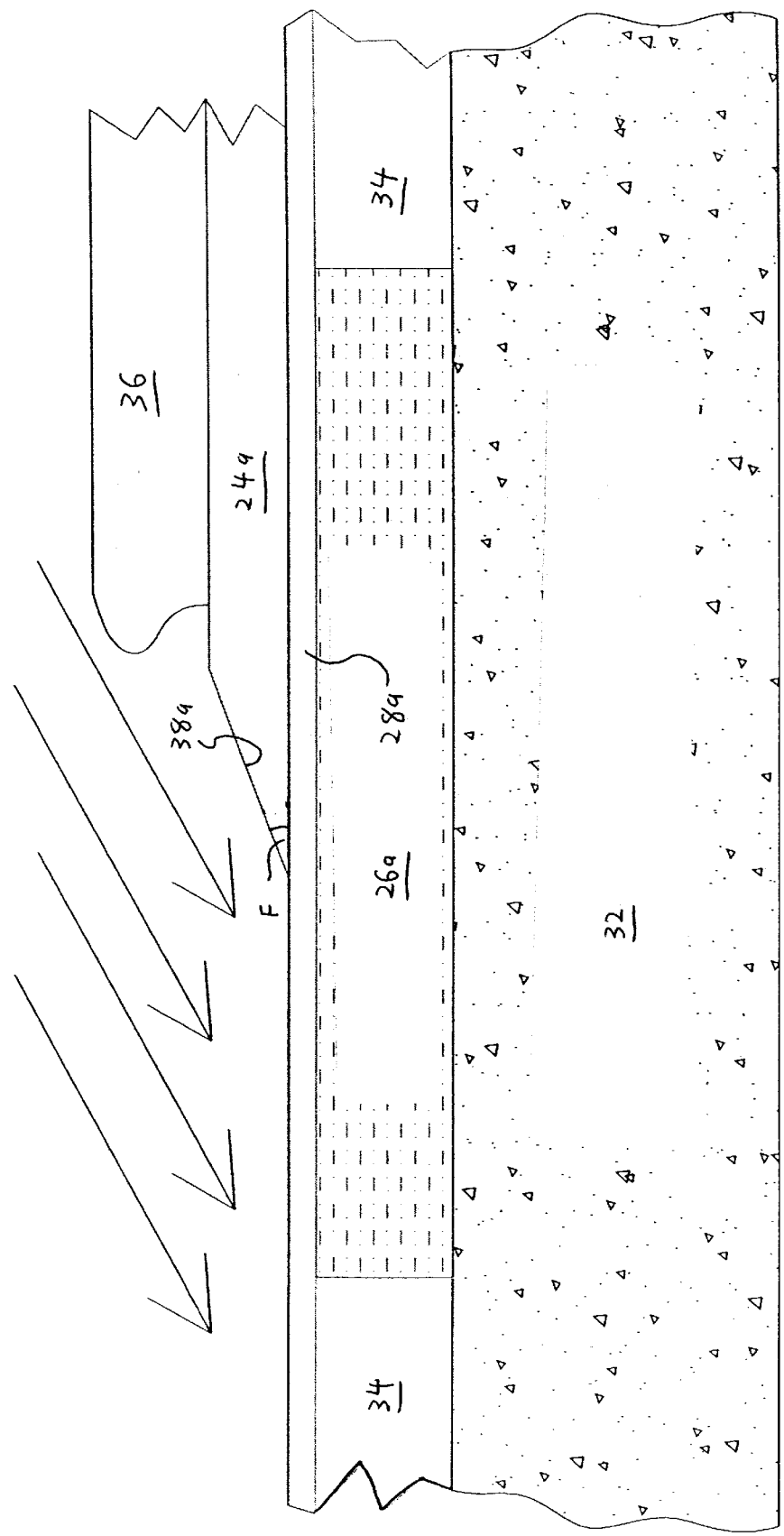
FIG. 6 is a bottom view of the components of FIG. 5, showing removal of unneeded contact material for use in a first embodiment of a perpendicular recording head using a CPP GMR read element after the according to the present invention.
Figure 7:
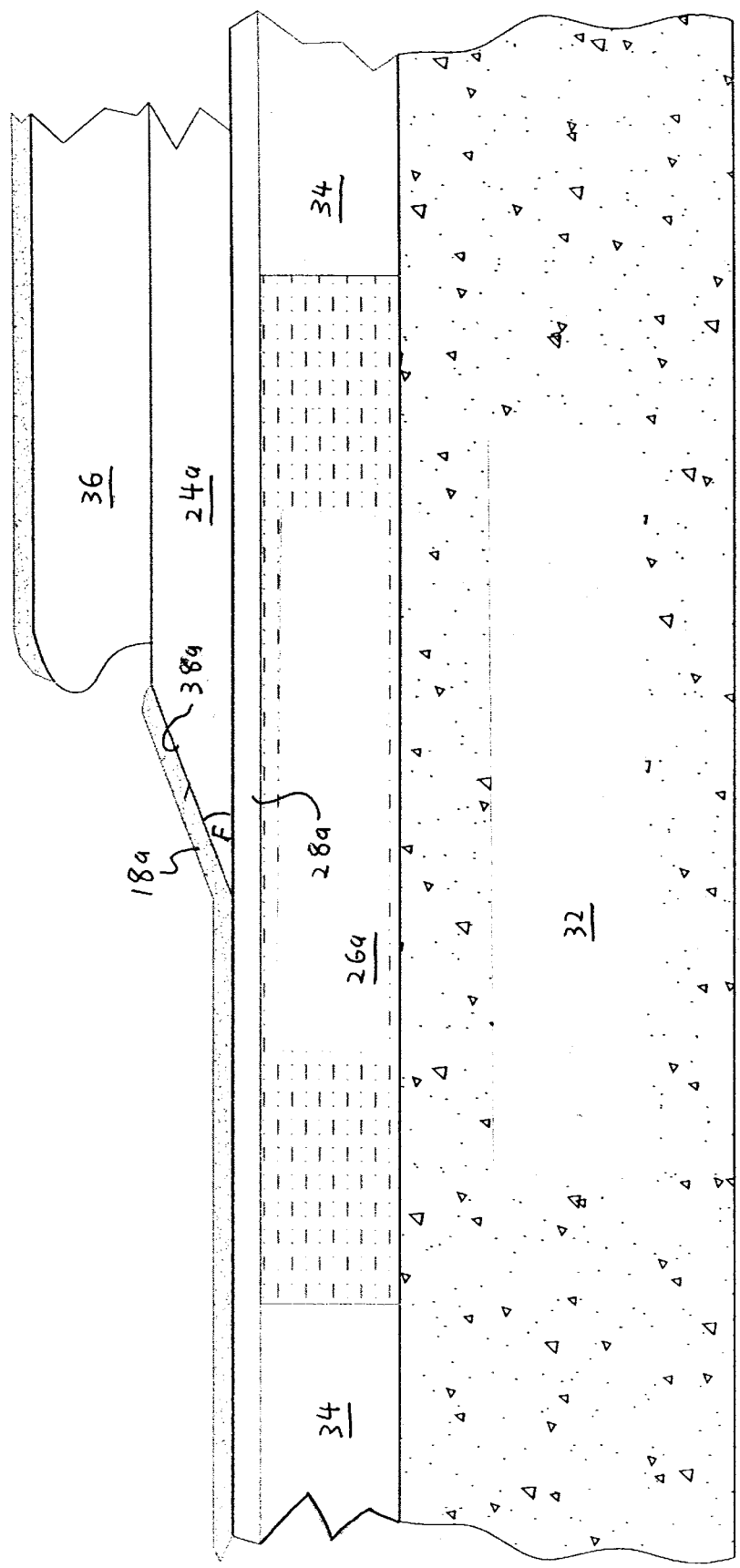
FIG. 7 is a bottom view of a substrate, first magnetic shield, first gap material, first contact, and initial deposit of GMR layers for use in a first embodiment of a perpendicular recording head using a CPP GMR read element after the according to the present invention.
Figure 8:
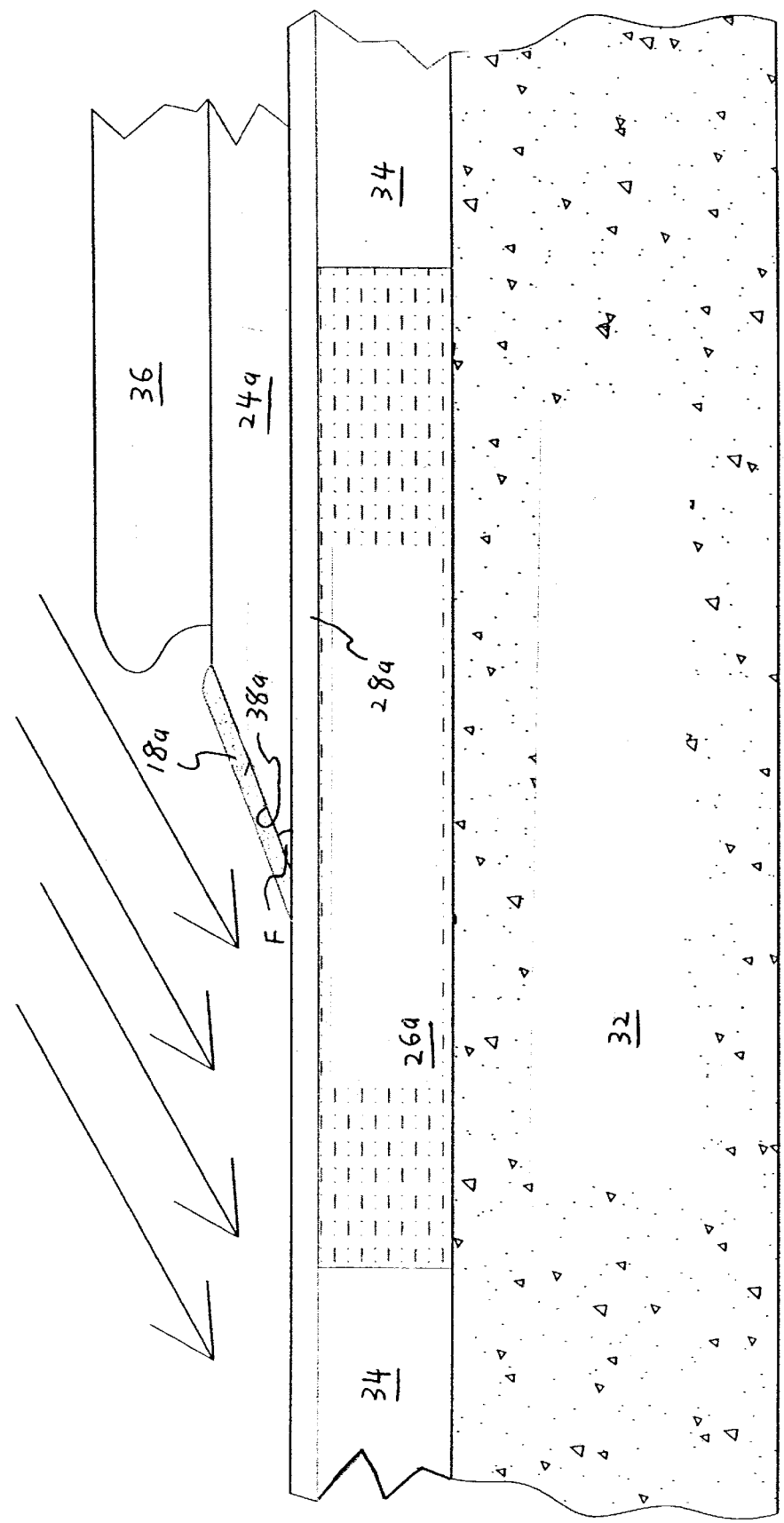
FIG. 8 is a bottom view of the components of FIG. 7, showing removal of unneeded GMR material for use in a first embodiment of a perpendicular recording head using a CPP GMR read element after the according to the present invention.
Figure 17:
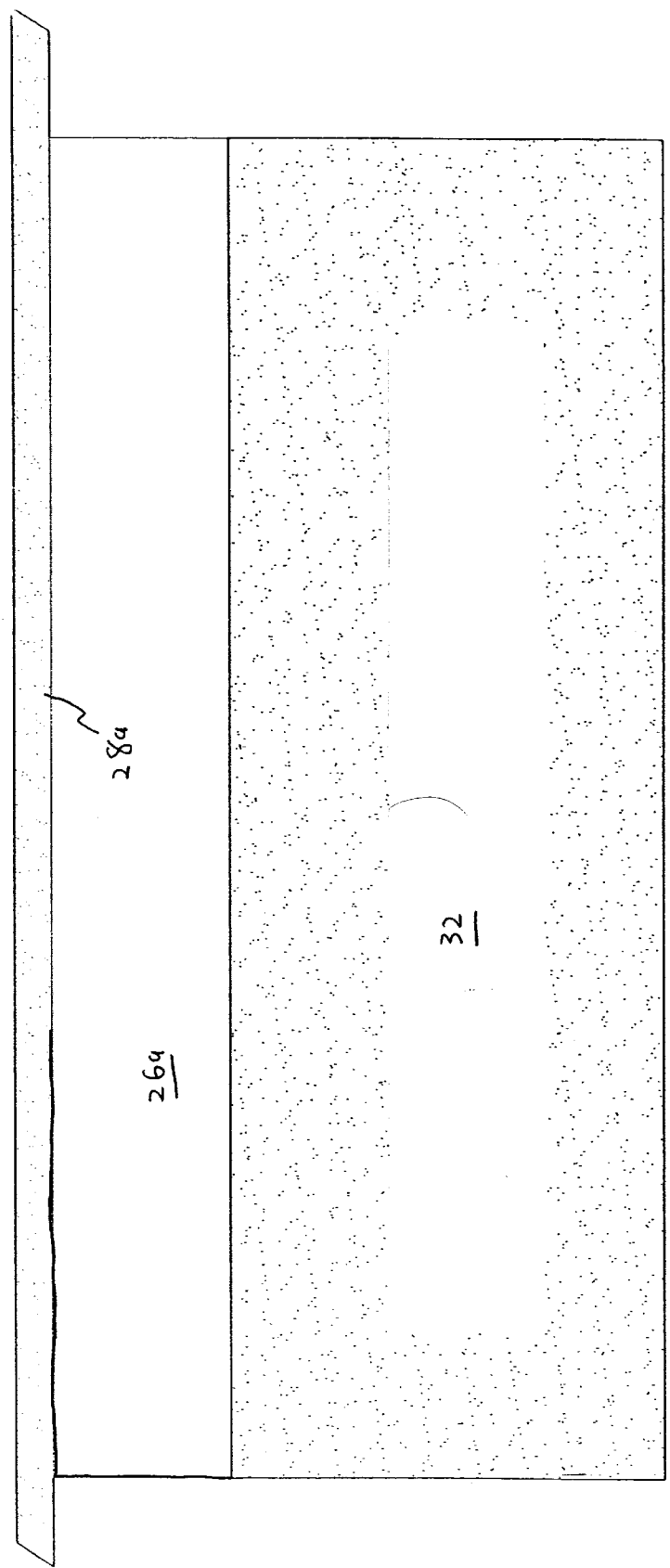
FIG. 17 is a bottom view of a substrate, first magnetic shield, and first gap material for use in a second embodiment of a perpendicular recording head using a CPP GMR read element after the according to the present invention.
Figure 18:
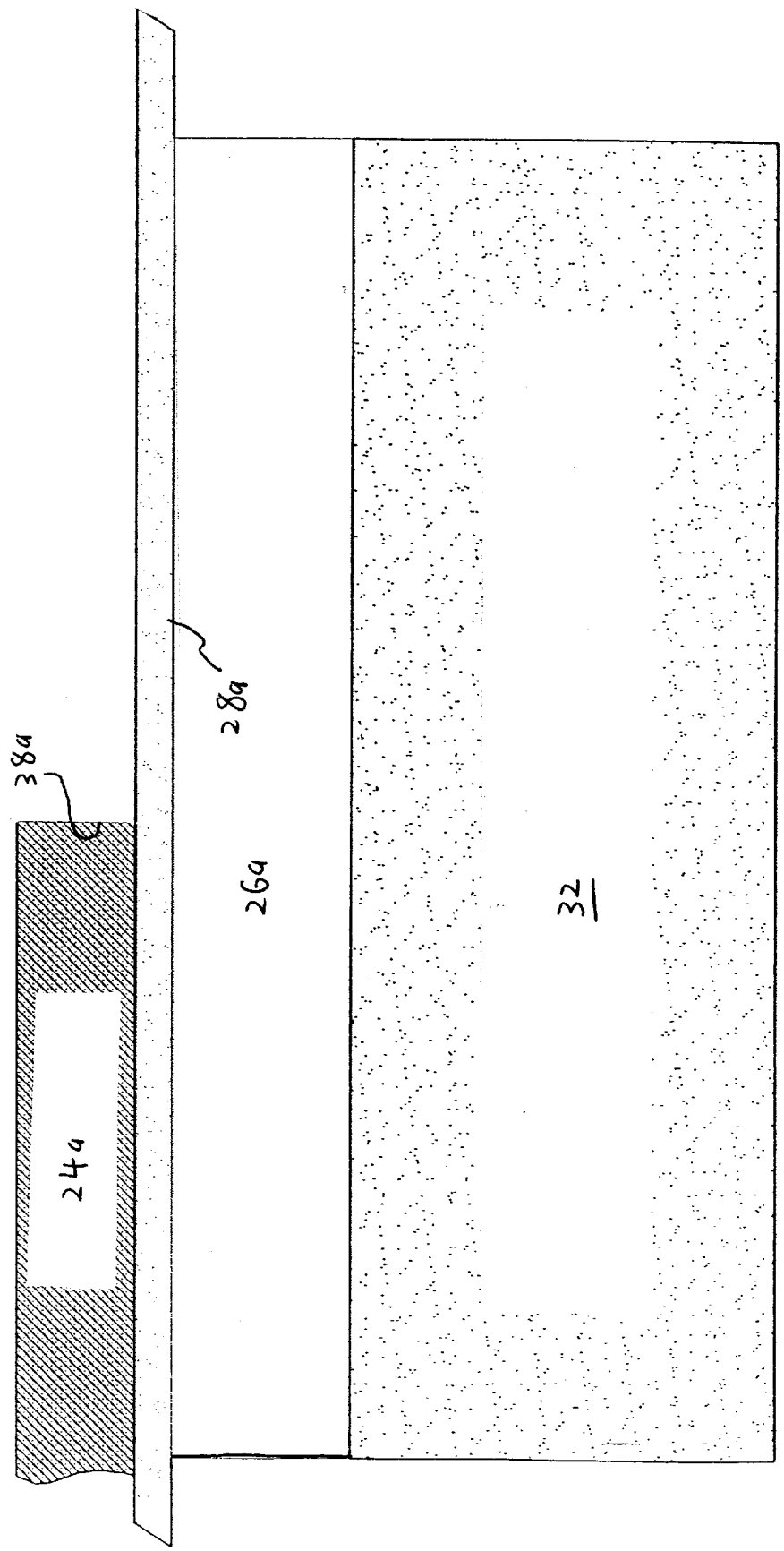
FIG. 18 is a bottom view of a substrate, first magnetic shield, first gap material, and first contact for use in a second embodiment of a perpendicular recording head using a CPP GMR read element after the according to the present invention.

Referring to FIGS. 3 and 17, the process begins with a substrate 32, which will typically be large enough so that several heads 10 may be assembled on a single substrate 32. The material (preferably Ni/Fe) forming the first shield 26a is first deposited on the substrate 32, and may include alumina ($Al_2O_3$) 34 on either side. Next, gap material (preferably alumina) 28a is deposited on the shield 26a (FIGS. 4,17). Subsequently, the material (preferably gold or copper) forming the first lead 24a is deposited (FIGS. 5,18). Photoresist 36 is placed on top of that portion of the material to remain, with the remaining material ion milled away (FIGS. 6,18), leaving only the lead 24a. The ion milling process defines the first electrical contact surface 38a, upon which the GMR element 18 will ultimately be formed.

Figure 9:
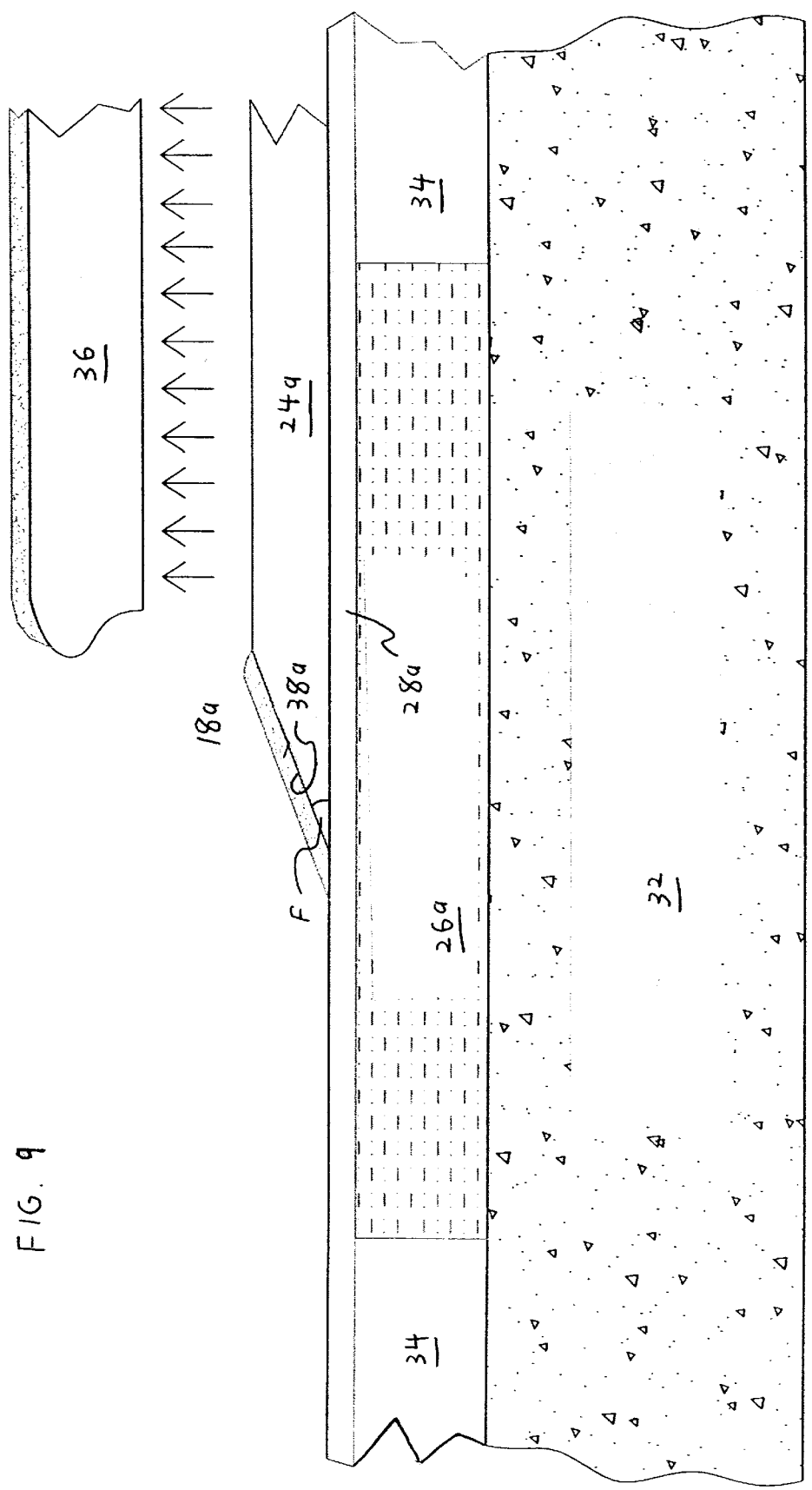
FIG. 9 is a bottom view of a substrate, first magnetic shield, first gap material, first contact, and GMR element after removal of photoresist for use in a first embodiment of a perpendicular recording head using a CPP GMR read element after the according to the present invention.
Figure 10:
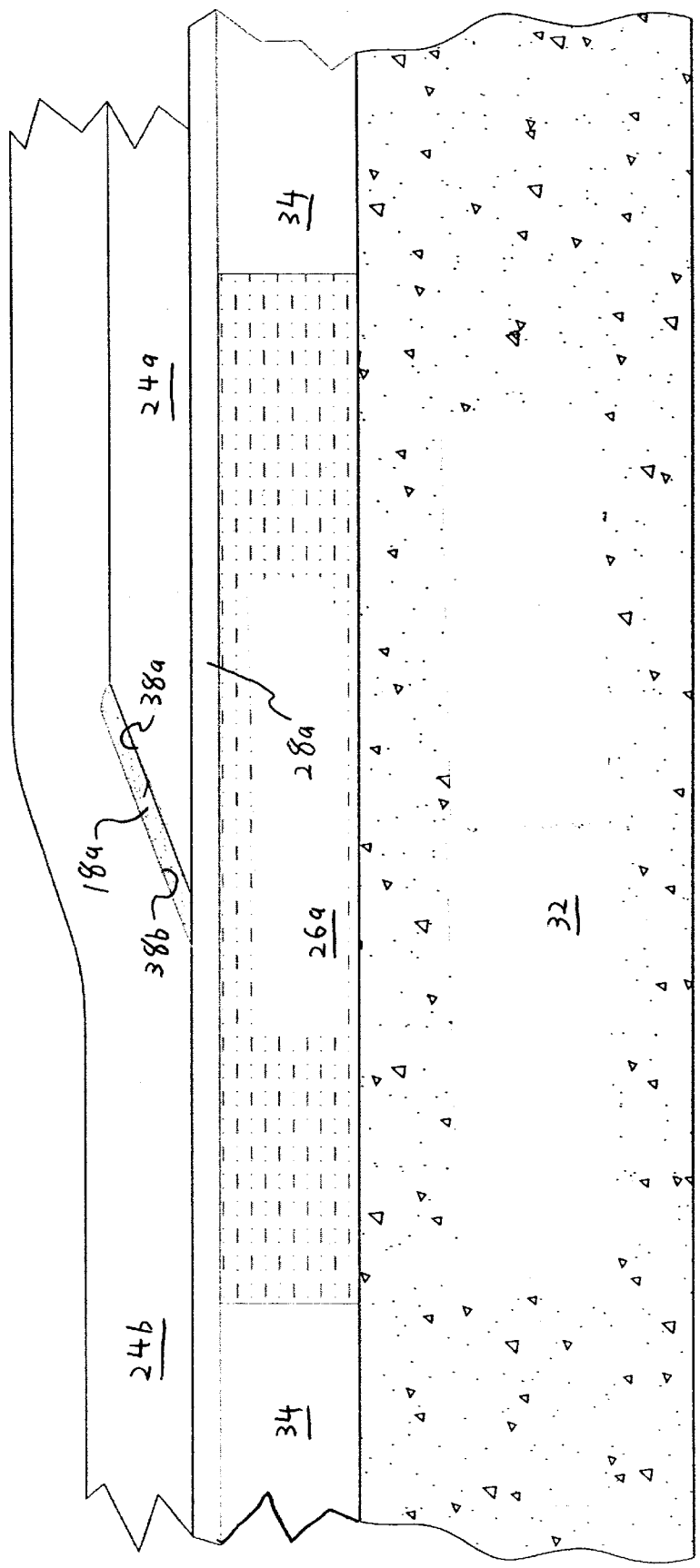
FIG. 10 is a bottom view of a substrate, first magnetic shield, first gap material, first contact, GMR element, and initially deposited second contact material for use in a first embodiment of a perpendicular recording head using a CPP GMR read element after the according to the present invention.
Figure 19:
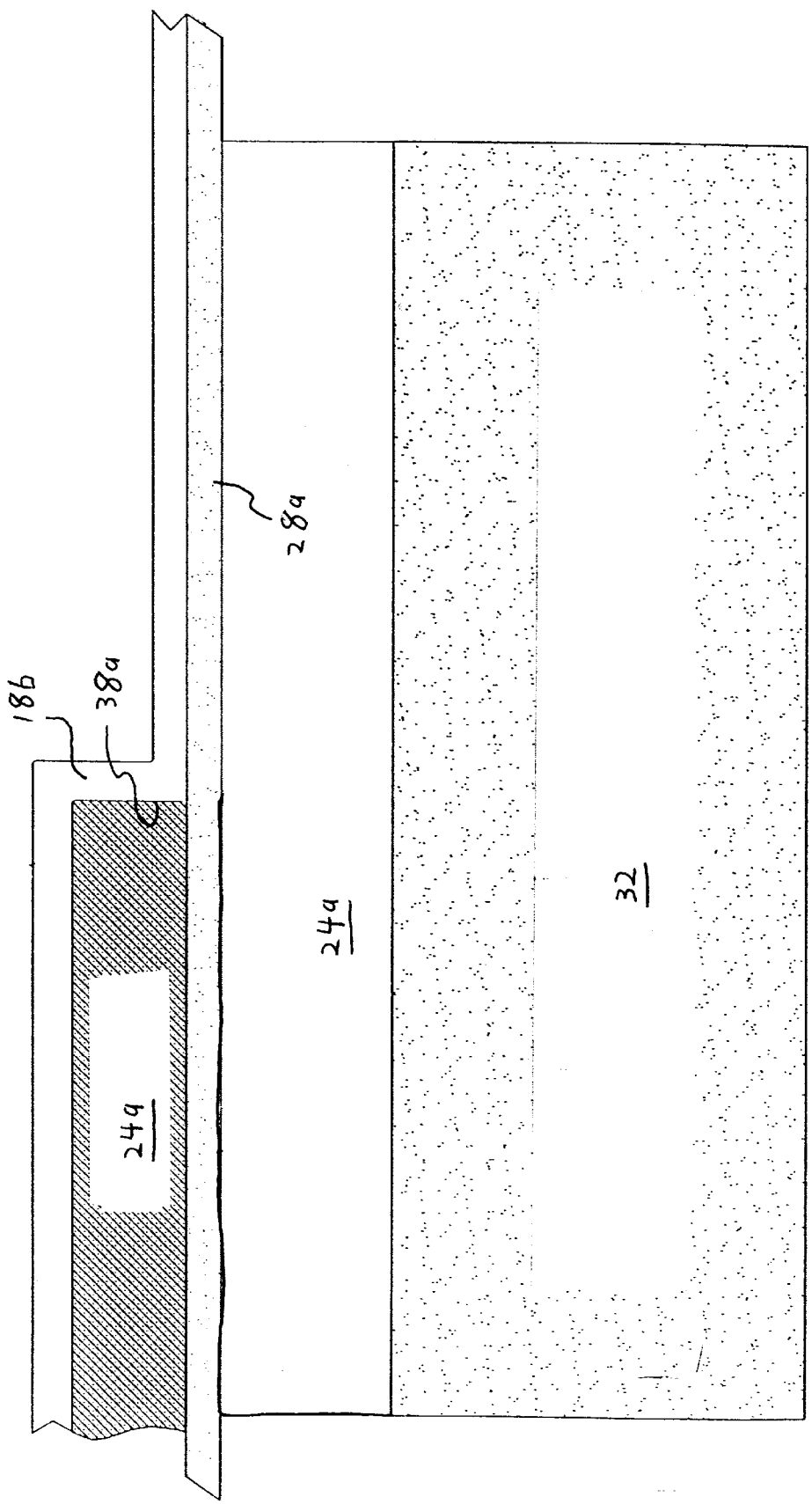
FIG. 19 is a bottom view of a substrate, first magnetic shield, first gap material, first contact, and initial deposit of GMR layers for use in a second embodiment of a perpendicular recording head using a CPP GMR read element after the according to the present invention.
Figure 20:
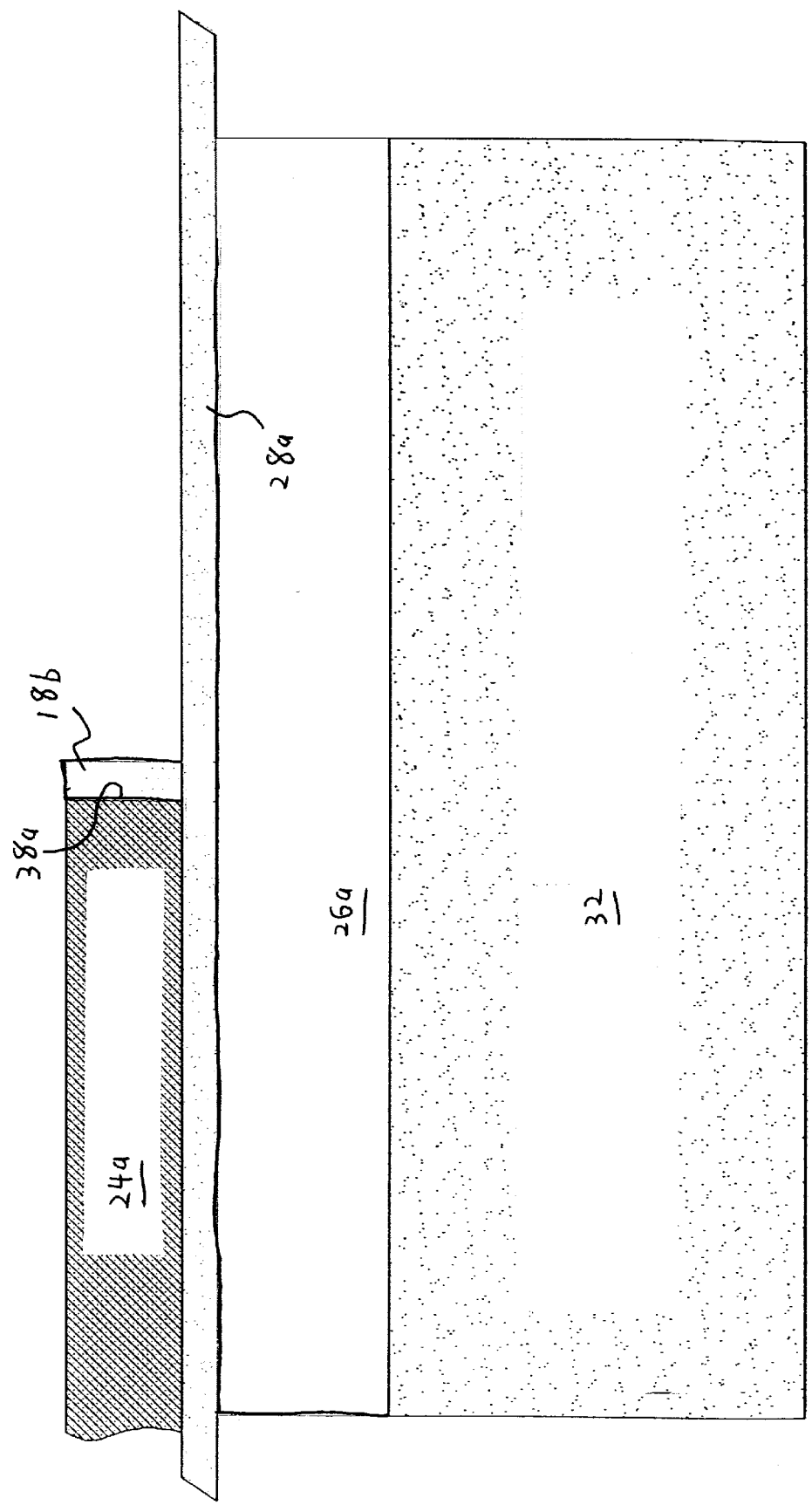
FIG. 20 is a bottom view of a substrate, first magnetic shield, first gap material, first contact, and GMR element for use in a second embodiment of a perpendicular recording head using a CPP GMR read element after the according to the present invention.

Next, the alternating magnetic (preferably Ni/Fe) and nonmagnetic (preferably Cu) layers that will eventually form the GMR element 18 are applied (FIGS. 7,19), with the undesired portions removed by ion milling (FIGS. 8,20), and the photoresist 36 thereafter removed (FIGS. 9,20). As can be seen in FIG. 19, if a substantially perpendicular GMR element 18b is desired, the GMR layers must be deposited on the surface 38a at an angle, thereby increasing the difficulty of the process. However, the width of the substantially perpendicular GMR element 18b is controlled by the number and thickness of deposited layers 20,22, as opposed to controlling the width of the angled GMR element 18a by controlling the angle F at which the surface 38a is created during the ion milling process.

Figure 11:
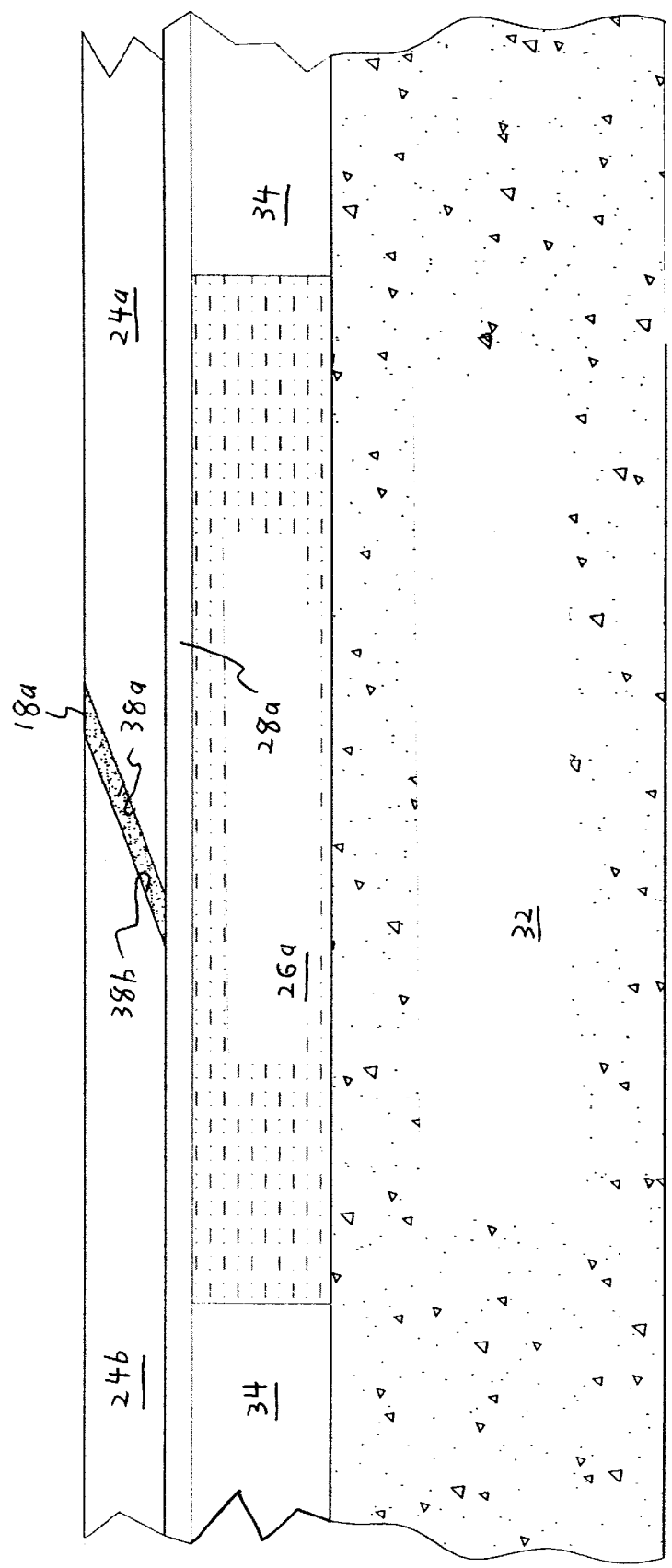
FIG. 11 is a bottom view of a substrate, first magnetic shield, first gap material, first contact, GMR element, and second contact for use in a first embodiment of a perpendicular recording head using a CPP GMR read element after removal of the unnecessary portion of the second contact material according to the present invention.
Figure 12:
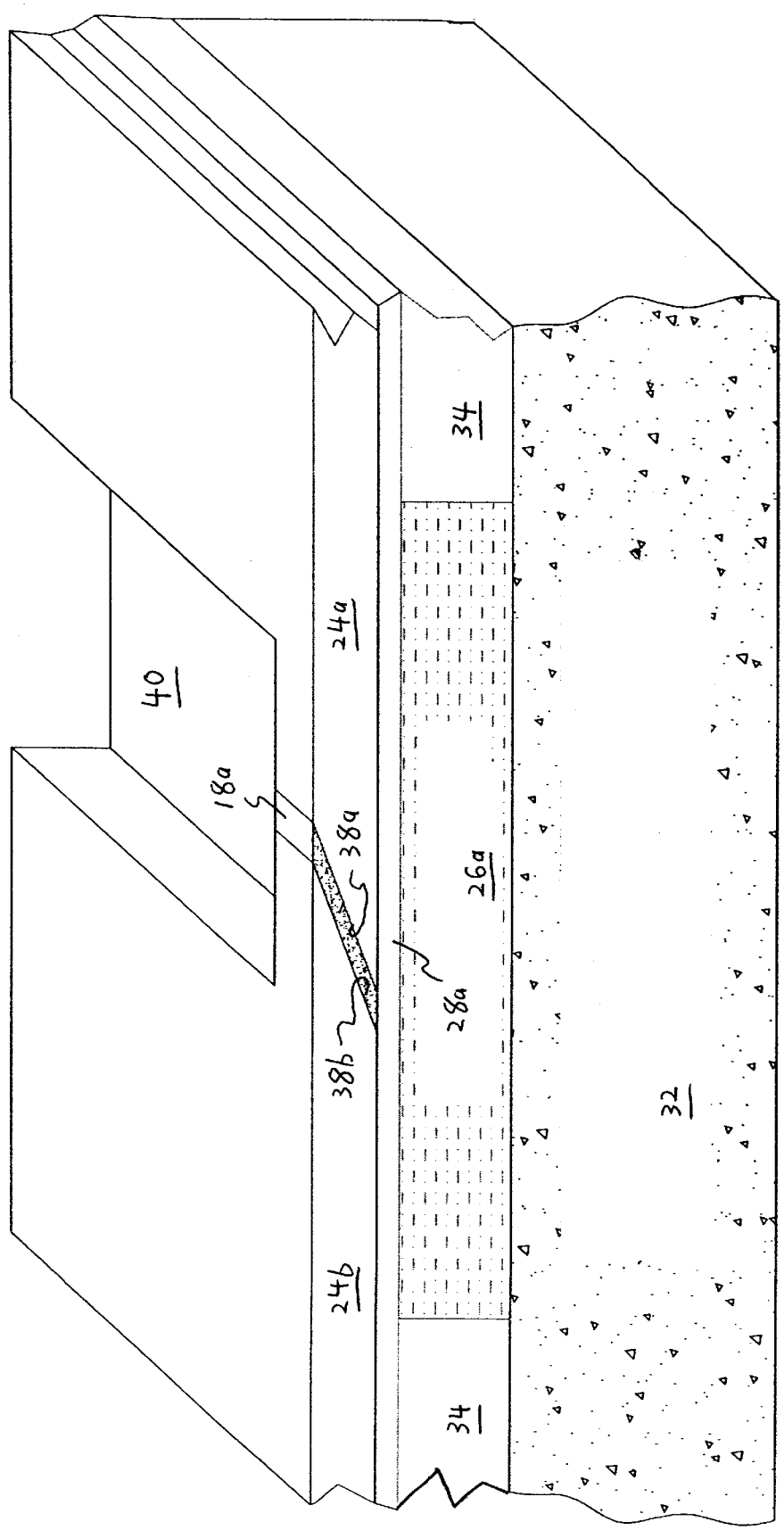
FIG. 12 is a bottom perspective view of the components of FIG. 10, after formation of a channel for containing a magnet for use in a first embodiment of a perpendicular recording head using a CPP GMR read element after the according to the present invention.
Figure 13:
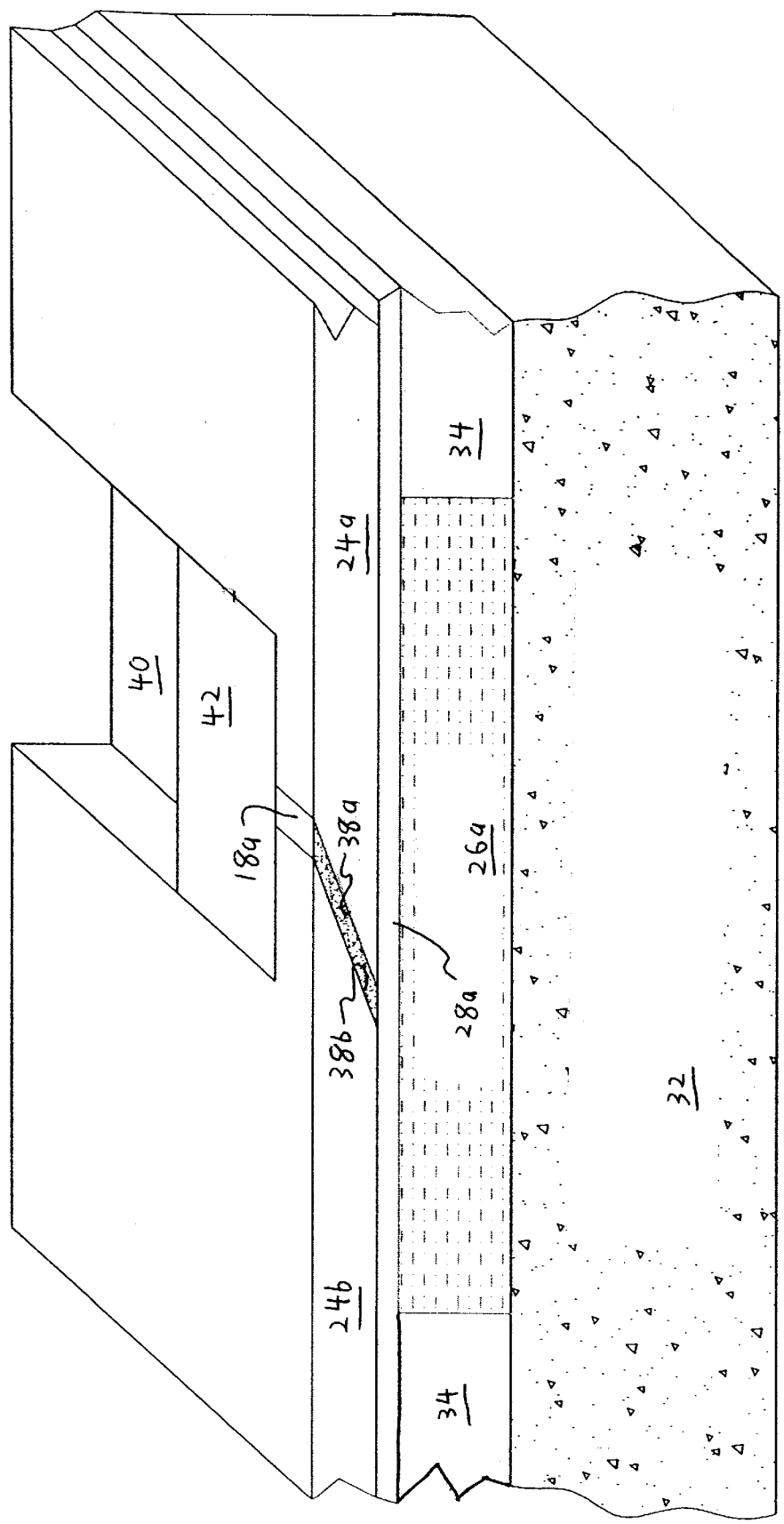
FIG. 13 is a bottom perspective view of a substrate, first magnetic shield, first gap material, first and second contacts, GMR element, and permanent magnet for use in a first embodiment of a perpendicular recording head using a CPP GMR read element after the according to the present invention.
Figure 14:
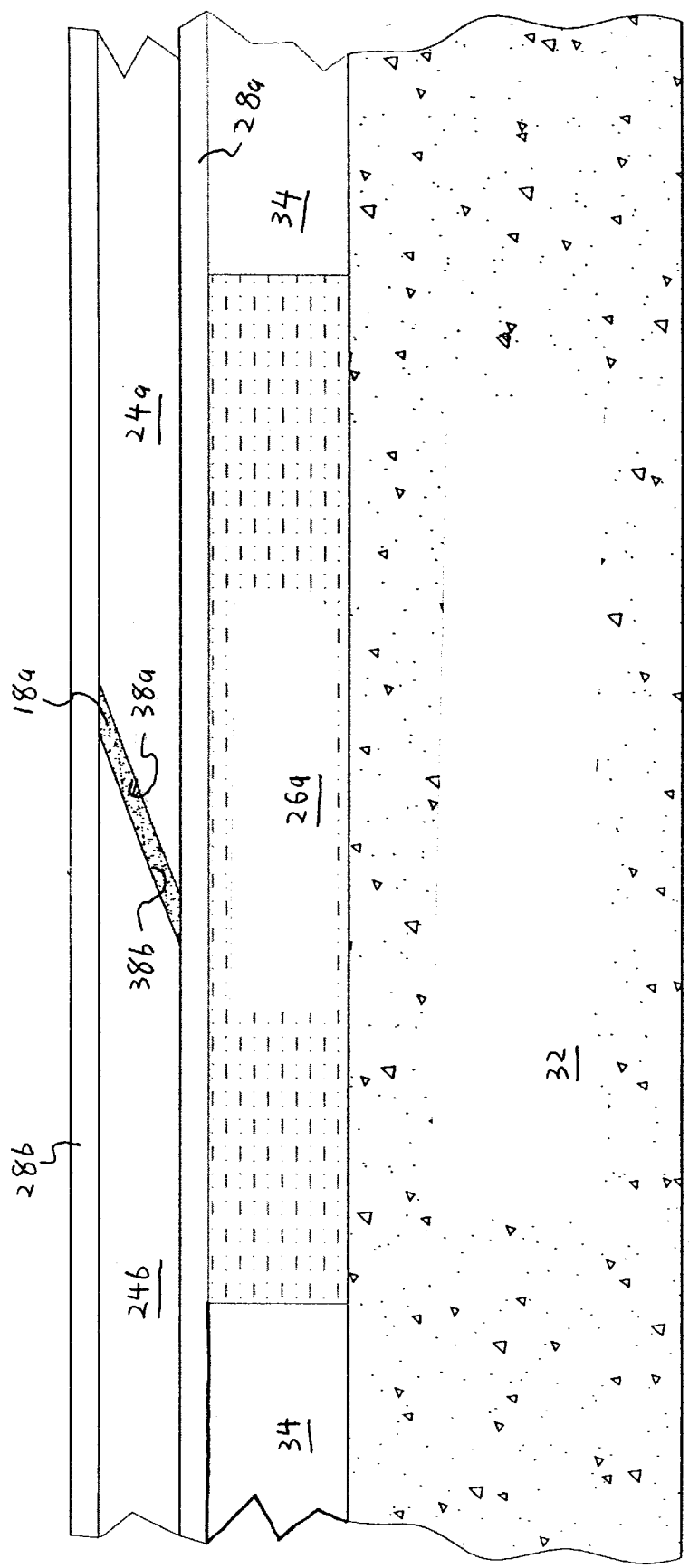
FIG. 14 is a bottom view of a substrate, first magnetic shield, first and second gap material, first and second contacts, and GMR element for use in a first embodiment of a perpendicular recording head using a CPP GMR read element after the according to the present invention.
Figure 15:
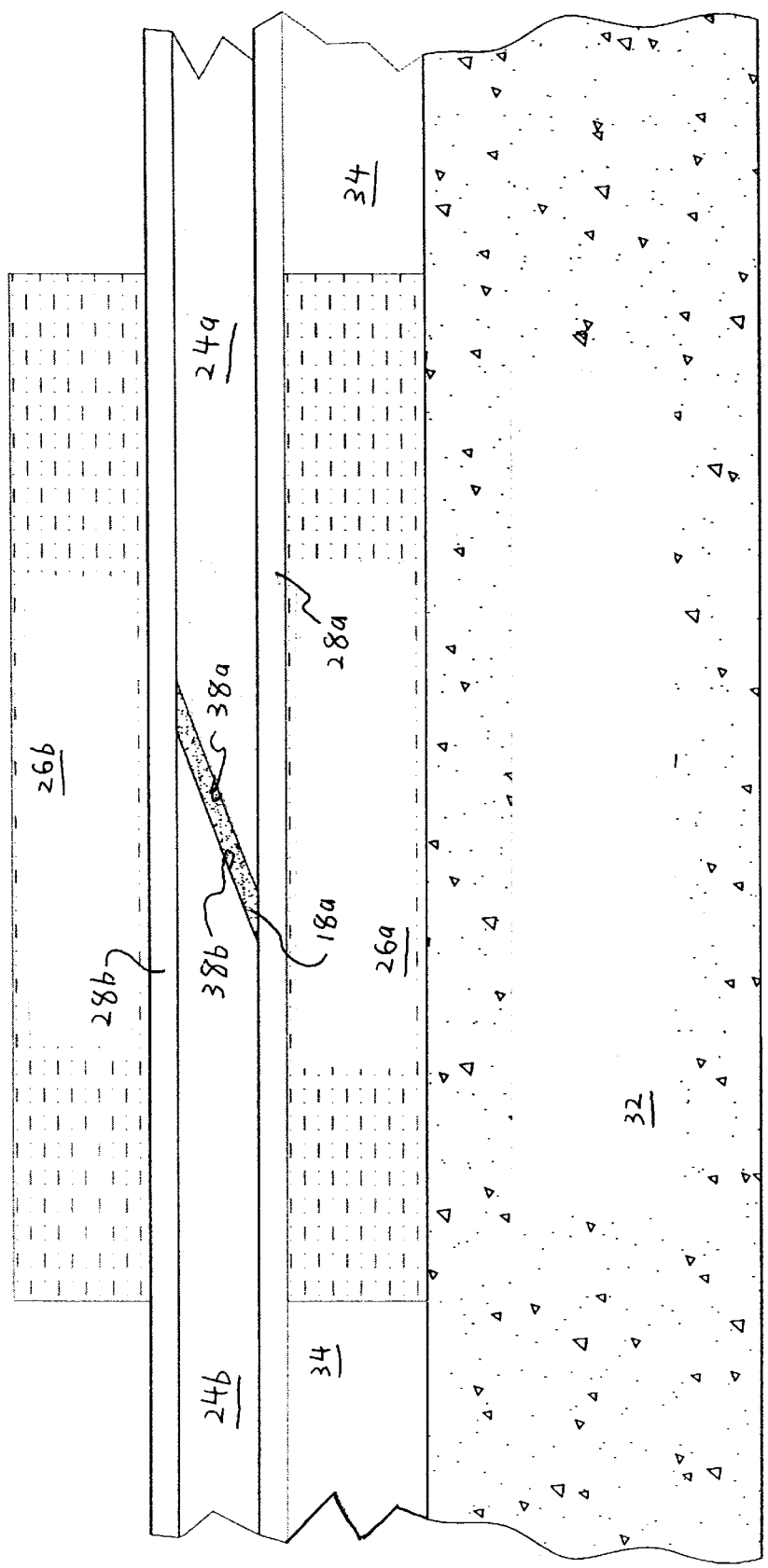
FIG. 15 is a bottom view of a substrate, first and second magnetic shields, first and second gap material, first and second contacts, and GMR element for use in a first embodiment of a perpendicular recording head using a CPP GMR read element after the according to the present invention.
Figure 23:
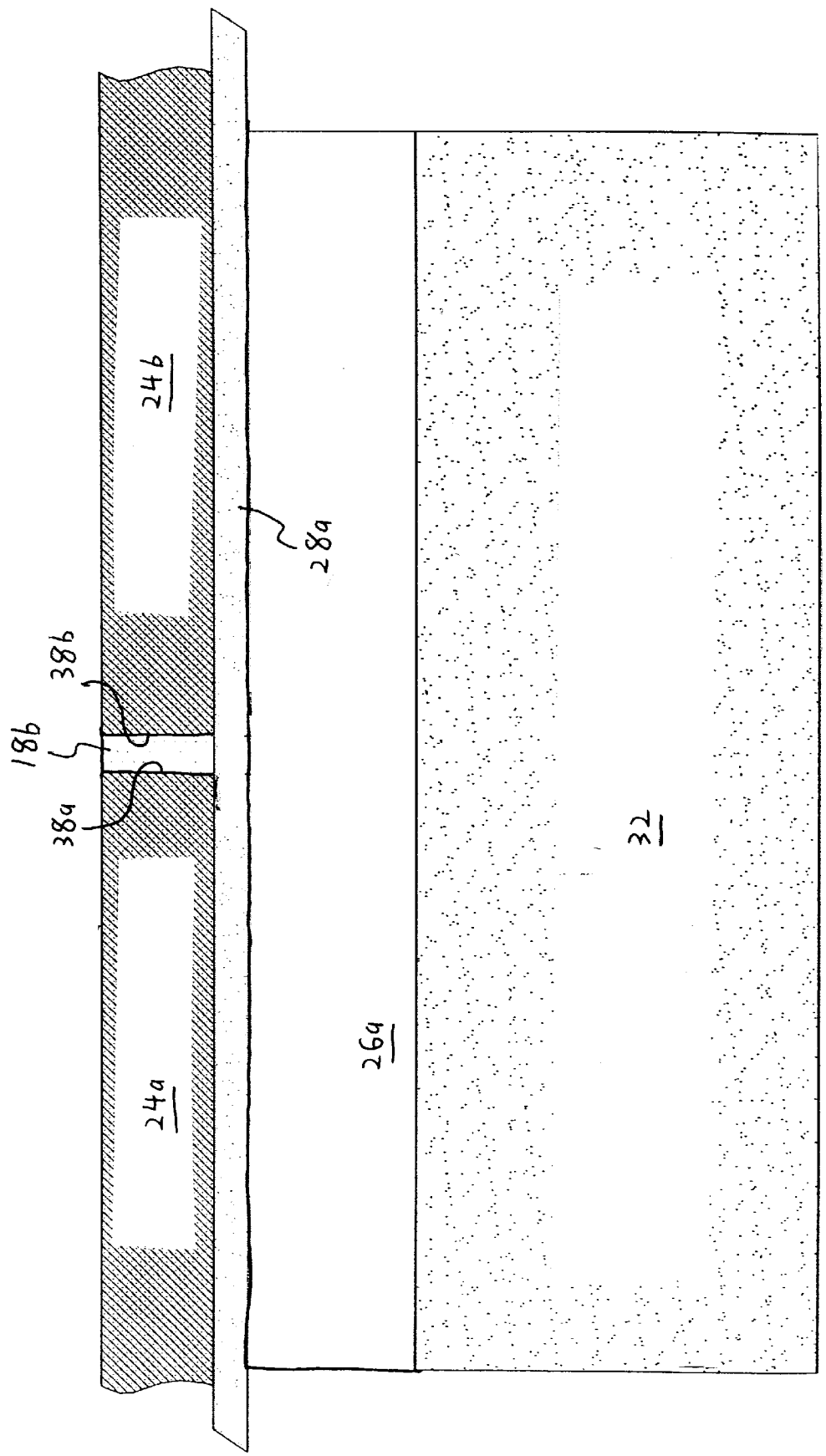
FIG. 23 is a bottom view of a substrate, first magnetic shield, first gap material, first contact, GMR element, and second contact for use in a second embodiment of a perpendicular recording head using a CPP GMR read element after the according to the present invention.
Figure 24:
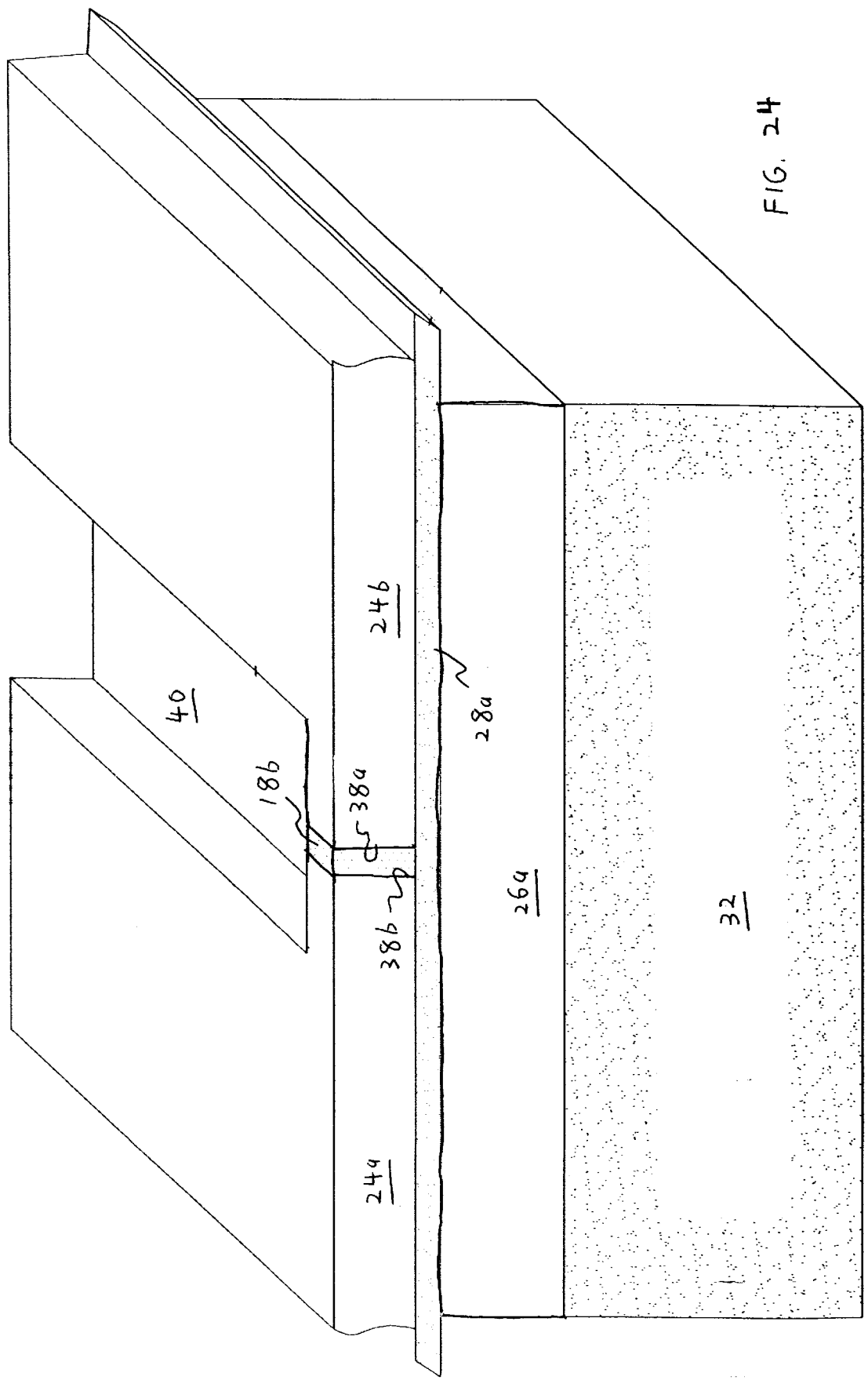
FIG. 24 is a bottom perspective view of the components of FIG. 10, after formation of a channel for containing a magnet for use in a second embodiment of a perpendicular recording head using a CPP GMR read element after the according to the present invention.
Figure 25:
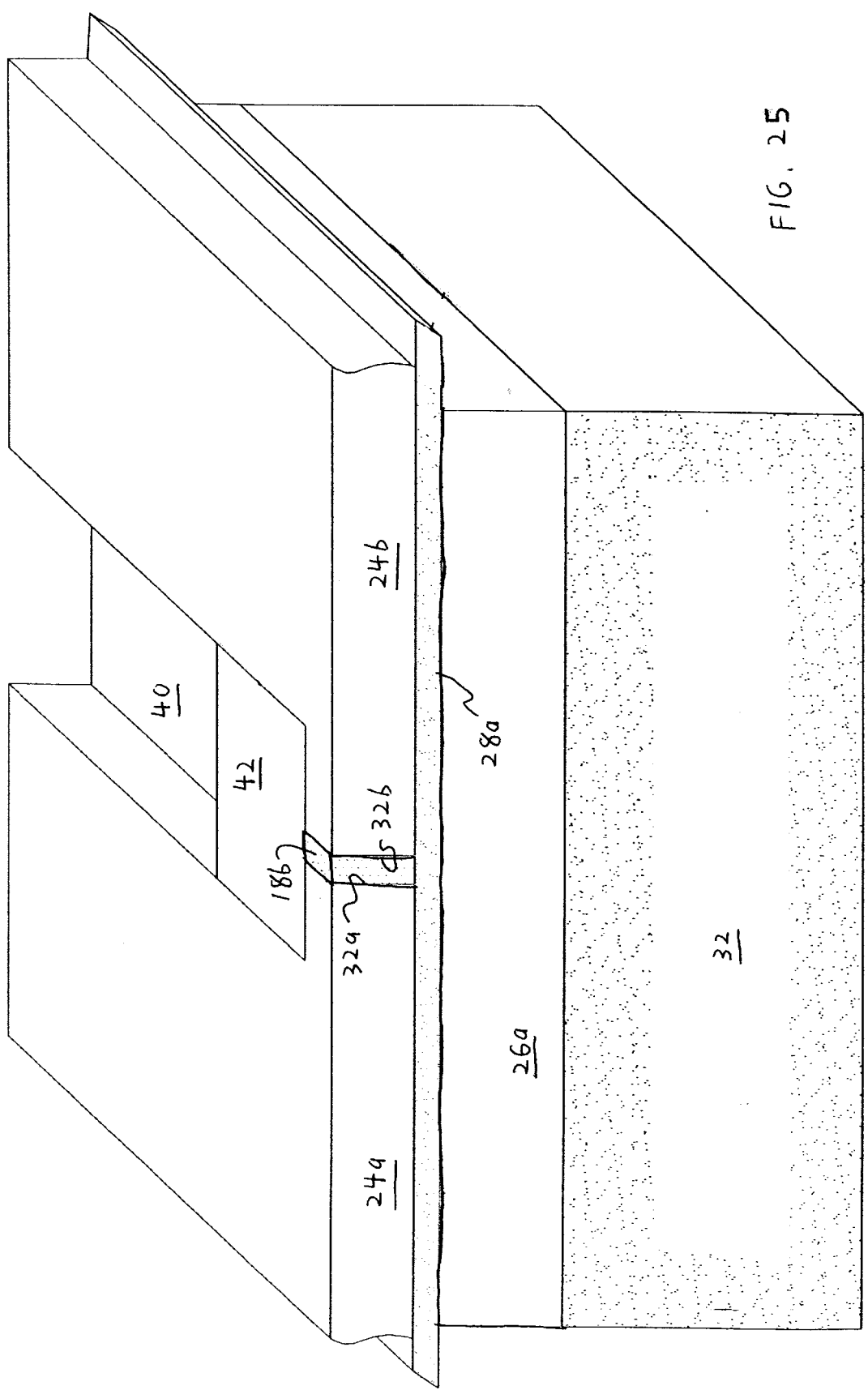
FIG. 25 is a bottom perspective view of a substrate, first magnetic shield, first gap material, first and second contacts, GMR element, and permanent magnet for use in a second embodiment of a perpendicular recording head using a CPP GMR read element after the according to the present invention.
Figure 26:
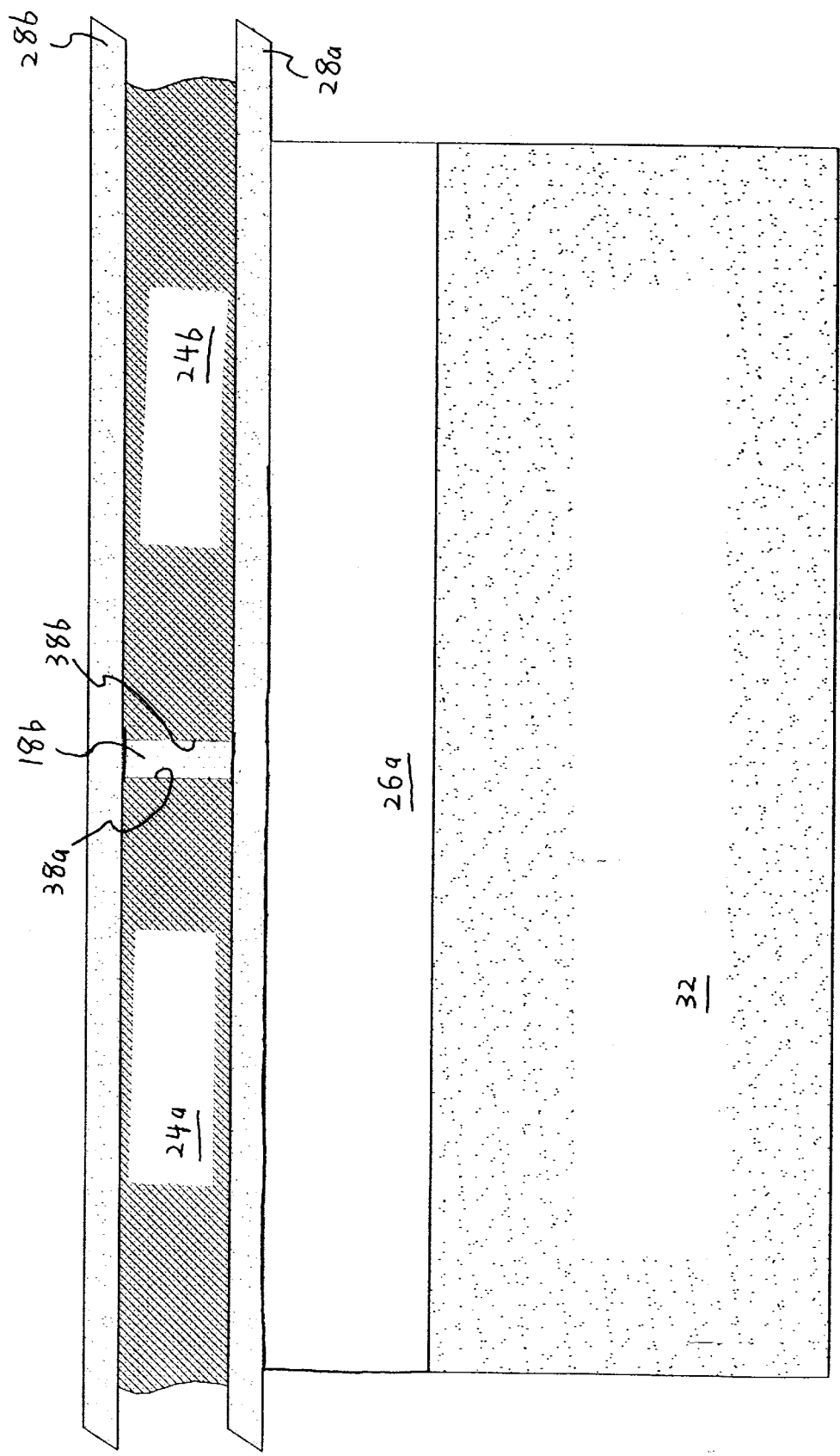
FIG. 26 is a bottom view of a substrate, first magnetic shield, first and second gap material, first and second contacts, and GMR element for use in a second embodiment of a perpendicular recording head using a CPP GMR read element after the according to the present invention.

With the GMR element 18a,18b now formed, the material forming the second lead (preferably gold or copper) 24b is deposited (FIGS. 10,22), thereby forming the second electrical contact surface 38b between lead 24b and GMR element 18. The undesired material is removed, preferably by chemical/mechanical polishing, leaving only the desired material forming lead 24b (FIGS. 11,23). Next, a channel 40 is defined between contacts 24a,24b, and above GMR element 18 (FIGS. 12,24, and a relatively weak permanent magnet 42 is placed within the channel 40 (FIGS. 13,25). A second gap material (preferably alumina) 28b is deposited over the leads 24a,24b, GMR element 18, and permanent magnet 42, and a second shield (preferably Ni/Fe) 26b is formed over the gap 28b (FIGS. 15,16). Lastly, the pole 30 is formed (FIGS. 2,16), and the substrate 32 cut to form the individual recording heads 10.

Referring to FIGS. 27–29, the individual magnetic fields represented schematically as 44,46 within the magnetic layer 20 of the GMR read element 18, in the absence of external biasing, will be antiparallel to each other, so that adjacent fields 44,46 will be parallel, but oriented in opposite directions (FIG. 27). The relative orientation of the magnetization 44,46 affect the spin-dependent scattering of conduction electrons, so that, when the magnetizations 44,46 are antiparallel, maximum resistance results. The resistance will vary according to the cosine of the angle between the magnetization directions within the magnetic layers, with a cosine of −1 (antiparallel) corresponding to maximum resistance, and a cosine of 1 (parallel) corresponding to minimum resistance. Parallel magnetizations 44,46 will result in minimum resistance (FIG. 29). The permanent magnet 42 (FIGS. 13,25) has a sufficiently strong magnetic field so that, in the absence of any other biasing, the individual magnetic fields 44,46 within each layer 20 of GMR element 18 are rotated away from their antiparallel orientation to a perpendicular orientation (FIG. 28). When the magnetic fields 44,46 are perpendicular, the cosine of the angle between them is zero, resulting in an intermediate level of resistance. When the GMR read element 18 is exposed to the magnetic fields of the domains within a magnetic recording medium 54 (FIG. 1), the magnetic field of the specific domain currently being read will rotate the magnetic fields 44,46 so that they are either parallel or antiparallel, thereby resulting in a cosine of the angle between them of either 1 or −1. The GMR read element will thereby have either a maximum or minimum resistance, depending on the orientation of the magnetic field being read.

Referring to FIGS. 1 and 27–29, reading from a magnetic recording medium is illustrated. The recording head 10 is positioned a distance known as the flying height A over the magnetic recording medium 54, and the magnetic recording medium 54 is passed under the head 10 so that a track 58 of the recording medium passes under the first shield 26a, GMR read element 18, second shield 26b, and pole 30. That portion of the track 58 directly under the GMR read head 18 will be read, with shields 26a,26b preventing other magnetic fields within the recording medium 54 from influencing the GMR read head 18. The magnetic field within the track 58 will be oriented either up or down if perpendicular recording is used, or forward and backward along the track if longitudinal recording is used. Depending on the orientation of the magnetic field in the portion of the track 58 being read, the magnetic fields within the magnetic layers 20 of the GMR read head 18 will be biased away from their default perpendicular orientation of FIG. 28, to either their antiparallel orientation of FIG. 27, thereby maximizing the electrical resistance of the nonmagnetic layers 22, or to their parallel orientation of FIG. 29, thereby minimizing the electrical resistance of the nonmagnetic layers 22. A test current is applied through one of the leads 24a,24b, through the GMR read element 18, to the opposing lead 24a,24b, to test the resistance of the GMR read element. A constant level of resistance, regardless of whether that level of resistance is the maximum or minimum level, is interpreted as a binary "0." Similarly, a change in the level of resistance from minimum to maximum, or from maximum to minimum, is read as a binary "1."

The present invention has the advantage of substantially increasing the read sensitivity of the GMR read element as compared to presently available CPP GMR read elements. Sensitivity of the GMR read element is maximized by maximizing both the total resistance within the GMR read element, and by maximizing the change in resistance as a function of applied magnetic field ($\Delta R$), with respect to the total resistance (R). Expressed differently, the quantity $\Delta R/R$ should also be maximized. The quantity $\Delta R/R$ can be maximized by increasing the number of alternating magnetic and nonmagnetic layers, and by optimizing the thickness of each individual layer. The total resistance is equal to the distance the current must travel through the GMR read element (L) multiplied by the resistivity ($\rho$), divided by the area the current may travel through (A). Expressed differently, $R=\rho L/A$. Therefore, resistance may be maximized by increasing the length through which the test current must travel, and by decreasing the area through which the test current travels. These factors should be balanced against the desirability of a narrow trackwidth to maximize storage density, and the need to fit the GMR element 18 into the recording head 10 along with the other components of the recording head 10.

Figure 30:
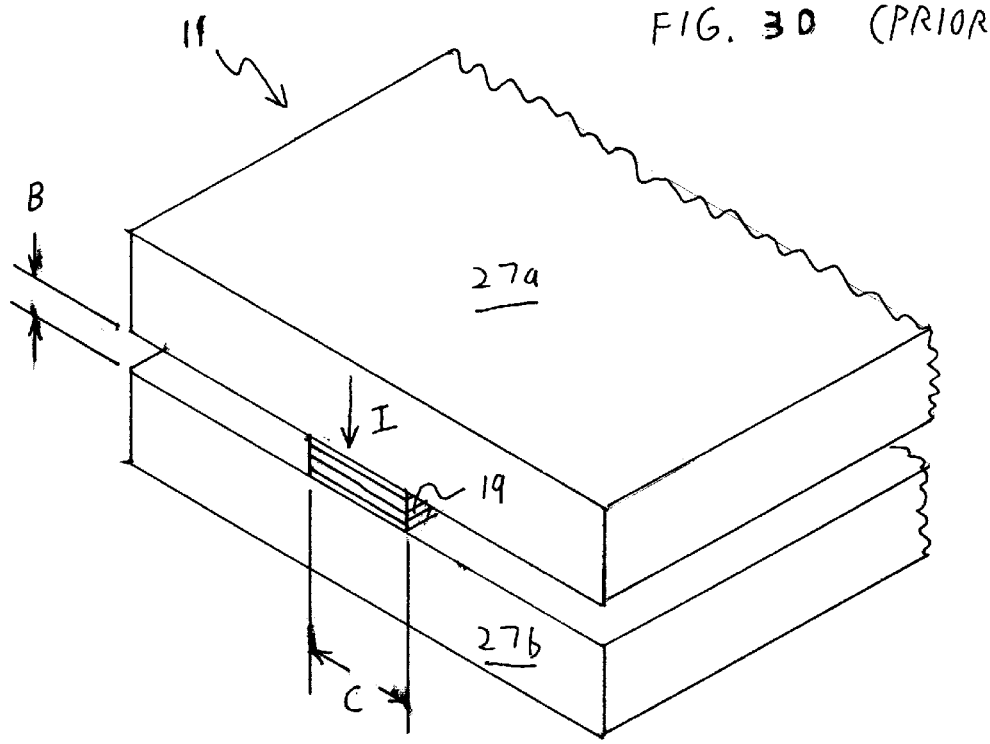
FIG. 30 is a bottom perspective view of a prior art CPP GMR read element and associated shields.
Figure 32:
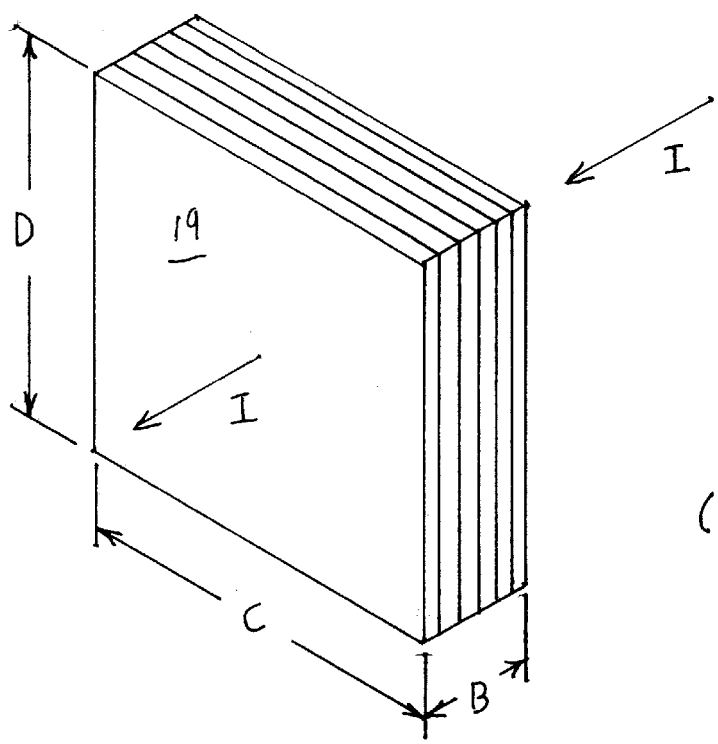
FIG. 32 is a perspective view of a prior art CPP GMR read element.

FIGS. 30 and 32 illustrate a typical present CPP GMR read head 11. The alternating magnetic and nonmagnetic layers of the GMR read element 19 are arranged parallel to the shields 27a,27b. The test current flows in the direction of arrow I, through a thickness of B and area equal to the width C multiplied by the height D of the GMR read element 19. The number of alternating magnetic and nonmagnetic layers, therefore, is limited by the distance B. A typical prior art GMR read element may have five alternating layers of magnetic and nonmagnetic material, limiting the extent to which $\Delta R/R$ may be maximized. Additionally, total resistance, determined by the relatively small length B, along with the relatively large area CD, is also limited. As an example, a typical GMR read head may have a thickness B of 17.5 nm, a width C of 100 nm, and a height D of 100 nm. A typical resistivity $\rho$ may be 80 $\mu\Omega$cm. Total resistance for this example will therefore be $R=\rho L/A=\rho B/CD=((80$ $\mu\Omega\text{cm})(17.5 \text{ nm})((1 \text{ }\Omega)/(1\times 10^6 \mu\Omega))((1\times 10^7 \text{ nm})/1 \text{ cm})))/((100 \text{ nm})(100 \text{ nm}))=1.4\Omega$.

Figure 31:
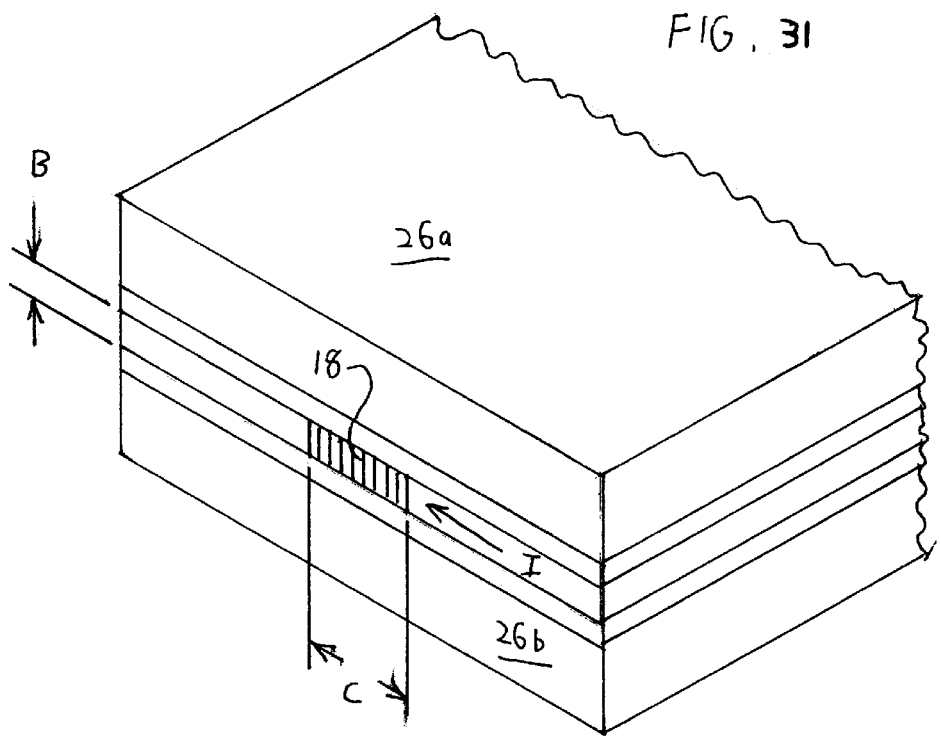
FIG. 31 is a bottom perspective view of a CPP GMR read element and associated shields of the present invention.
Figure 33:
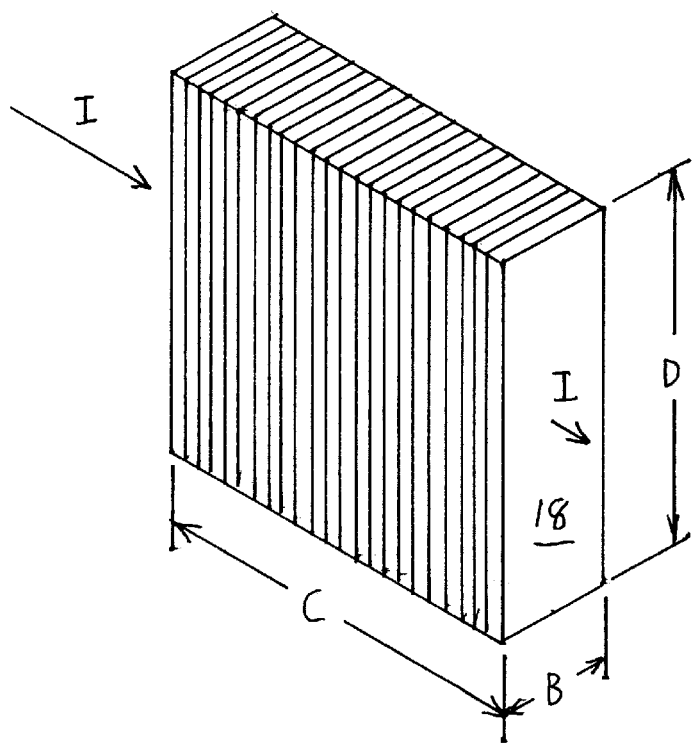
FIG. 33 is a perspective view of a CPP GMR read element according to the present invention.

Contrast the above example with the embodiment of the present invention, illustrated in FIGS. 31 and 33, wherein the alternating magnetic and nonmagnetic layers of the GMR element 18 are arranged perpendicular to the shields 26a,26b. Because the current, again flowing in the direction indicated by the arrow I, now passes through an increased number of layers of alternating magnetic and nonmagnetic material, the quantity $\Delta R/R$ is maximized for the same size GMR read element. Applying the dimensions of the above example to a GMR read element 18 of the present invention, the total resistance for the GMR element 18 is $R=\rho L/A=\rho C/BD=((80$ $\mu\Omega\text{cm})(100 \text{ nm})((1 \text{ }\Omega)/(1\times 10^6 \text{ }\mu\Omega))((1\times 10^7 \text{ nm})/1 \text{ cm})))/((100 \text{ nm})(17.5 \text{ nm}))=46 \text{ }\Omega$.

Referring back to FIGS. 1 and 27–29, it becomes apparent that the alternating magnetic 20 and nonmagnetic 22 layers of GMR element 18b, by being perpendicular to the shields 26a,26b, are also substantially parallel to the track 58. Because the magnetizations 44,46 within the magnetic layers 20 rotate within the layers, this orientation provides sensitivity to both vertical and horizontal magnetic fields within the track 58. The sensitivity of the magnetizations from fields perpendicular to the tracks is rather low yielding strongly reduced sensitivity to stray fields from adjacent tracks. This will result in improved performance of the proposed CPP read sensor over presently available CPP sensors, which are sensitive to stray fields from adjacent tracks. Referring to FIG. 2, it becomes apparent that the GMR read element 18, which is angled with respect to the shields, will exhibit at least some reduced sensitivity to stray magnetic fields of adjacent tracks 58.

While specific embodiments of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A magnetic recording head, comprising:
    a giant magnetoresistive read element; and
    means for maximizing a change in resistance of the giant magnetoresistive read element as a function of magnetic field relative to the total resistance of the giant magnetoresistive read element.

2. A magnetic recording apparatus including a recording head, comprising:
    a first shield defining a plane;
    a second shield defining a plane;
    a giant magnetoresistive read element having a plurality of alternating magnetic and nonmagnetic layers, said layers having a planar orientation non-parallel with respect to at least one of said planes defined by said first and second shield.

3. The magnetic recording apparatus according to claim 2, wherein said layers are substantially perpendicular to at least one of said planes defined by said first and second shield.

4. The magnetic recording apparatus according to claim 2, wherein said layers are angled to at least one of said planes defined by said first and second shield.

5. The magnetic recording apparatus according to claim 4, wherein said layers form an angle between 10° and 80° with respect to at least one of said planes defined by said first and second shield.

6. The magnetic recording apparatus according to claim 2, wherein said giant magnetoresistive element receives test current substantially perpendicular to a plane defined by said alternating magnetic and nonmagnetic layers.

7. The magnetic recording apparatus according to claim 2, wherein said magnetic recording head is a longitudinal recording head.

8. The magnetic recording apparatus according to claim 7, wherein:

said longitudinal recording head includes a first and second opposing pole; and said first opposing pole forms said second shield.

9. The magnetic recording apparatus according to claim 2, wherein said magnetic recording head is a perpendicular recording head.

10. The magnetic recording apparatus according to claim 9, wherein:

said perpendicular recording head includes a main pole and an opposing pole; and said opposing pole forms said second shield.

11. The magnetic recording apparatus according to claim 2, further comprising:

a magnetic recording medium, including a magnetically hard layer with a plurality of alternating magnetized tracks and nonmagnetized transitions.

12. The magnetic recording apparatus according to claim 11, further comprising a second, magnetically soft layer.

13. The magnetic recording apparatus according to claim 11, wherein said alternating magnetic and nonmagnetic layers of said giant magnetoresistive read element are oriented in a plane substantially perpendicular to a surface of said magnetically hard layer, and substantially parallel to said tracks.

14. The magnetic recording apparatus according to claim 11, wherein said alternating magnetic and nonmagnetic layers of said giant magnetoresistive read element are oriented in a plane substantially perpendicular to a surface of said magnetically hard layer, and angled with respect to said tracks.

* * * * *

UNITED STATES PATENT AND TRADEMARK OFFICE
CERTIFICATE OF CORRECTION

PATENT NO. : 6,519,119 B1
DATED : February 11, 2003
INVENTOR(S) : Petrus A. van der Heijden and Billy Wayne Crue It is certified that error appears in the above-identified patent and that said Letters Patent is hereby corrected as shown below:

<u>Title page, Item [54] and Column 1, lines 1-3,</u>
Title, "STRUCTURE FOR CURRENT PERRPENDICULAR TO PLANE GIANT MAGNETORESISTIVE READ HEADS" should read -- STRUCTURE FOR CURRENT PERPENDICULAR TO PLANE GIANT MAGNETORESISTIVE READ HEADS --.

Signed and Sealed this

Twentieth Day of July, 2004

JON W. DUDAS
*Acting Director of the United States Patent and Trademark Office*